United States Patent
Nishi et al.

(10) Patent No.: US 9,903,740 B2
(45) Date of Patent: Feb. 27, 2018

(54) ROTATION-ANGLE DETECTING DEVICE, IMAGE PROCESSING APPARATUS, AND ROTATION-ANGLE DETECTING METHOD

(71) Applicants: Hirofumi Nishi, Kanagawa (JP); Tatsuya Kawase, Kanagawa (JP)

(72) Inventors: Hirofumi Nishi, Kanagawa (JP); Tatsuya Kawase, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 177 days.

(21) Appl. No.: 14/554,201

(22) Filed: Nov. 26, 2014

(65) Prior Publication Data
US 2015/0153154 A1 Jun. 4, 2015

(30) Foreign Application Priority Data

Nov. 29, 2013 (JP) .................................. 2013-246949

(51) Int. Cl.
G01D 5/245 (2006.01)
G06K 9/52 (2006.01)
G06T 1/00 (2006.01)

(52) U.S. Cl.
CPC ............ *G01D 5/2451* (2013.01); *G06K 9/52* (2013.01); *G06T 1/00* (2013.01)

(58) Field of Classification Search
CPC ........ G01D 5/14; G01D 5/145; G01D 5/2415; G01D 5/2451; H03M 1/485
USPC ........................................ 324/207.2, 207.25
See application file for complete search history.

(56) References Cited

U.S. PATENT DOCUMENTS

| 6,608,573 | B2 * | 8/2003 | Kushihara | ............. H03M 1/485 |
| 7,119,717 | B2 * | 10/2006 | Takehara | |
| 7,174,270 | B2 * | 2/2007 | Kokubo | |
| 2008/0159784 | A1 * | 7/2008 | Seto | |
| 2013/0046488 | A1 * | 2/2013 | Donovan | ................ G01P 3/487 |
| | | | | 702/57 |
| 2013/0099708 | A1 | 4/2013 | Shimizu et al. | |

FOREIGN PATENT DOCUMENTS

| JP | 59-190617 | 10/1984 |
| JP | 2-220111 | 9/1990 |
| JP | 2004-191101 | 7/2004 |
| JP | 2004-301772 | 10/2004 |
| JP | 2005-128002 | 5/2005 |
| JP | 2013-108971 | 6/2013 |

OTHER PUBLICATIONS

Japanese official action dated Oct. 3, 2017 in connection with Japanese patent application No. 2013-246949.

* cited by examiner

*Primary Examiner* — Walter L Lindsay, Jr.
*Assistant Examiner* — Milton Gonzalez
(74) *Attorney, Agent, or Firm* — Cooper & Dunham LLP

(57) ABSTRACT

A rotation-angle detecting device includes: an angle detecting unit that detects a rotation angle of a rotating body on the basis of sinusoidal wave signals that multiple sensors arranged to have a phase difference output according to the rotation angle of the rotating body; and a resolution setting unit that allows change of a resolution of the rotation angle detected by the angle detecting unit.

18 Claims, 21 Drawing Sheets precise=0:

| θd[1] | θd[0] | ENCA | ENCB |
|---|---|---|---|
| 0 | 0 | 1 | 0 |
| 0 | 1 | 1 | 1 |
| 1 | 0 | 0 | 1 |
| 1 | 1 | 0 | 0 | precise=1:

| θd[2] | θd[1] | ENCA | ENCB |
|---|---|---|---|
| 0 | 0 | 1 | 0 |
| 0 | 1 | 1 | 1 |
| 1 | 0 | 0 | 1 |
| 1 | 1 | 0 | 0 |

FIG.14
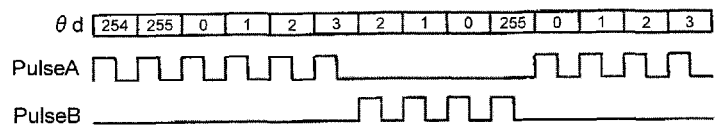
FIG.15A
POSITIVE DIRECTION
(RIGHT ROTATION)
PULSE
DIR
(Hi)
FIG.15B
NEGATIVE DIRECTION
(LEFT ROTATION)
PULSE
DIR
(Lo)
FIG.16
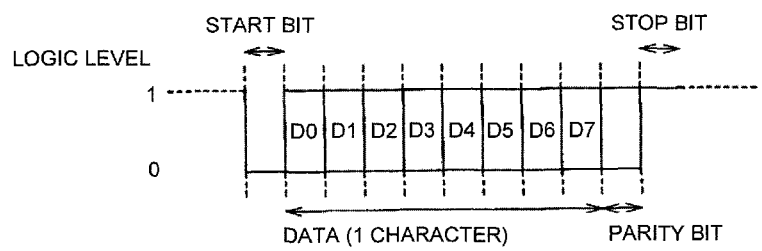

|    |    | OUTPUT VALUE AND CONDITION | |
|----|----|------|------|
|    |    | HIGH | LOW |
| HG | HU | HU+≥HU- | HU+<HU- |
|    | HV | HV+≥HV- | HV+<HV- |
|    | HW | HW+≥HW- | HW+<HW- |

FIG.27

|  | UPPER GATE SIGNAL YH | LOWER GATE SIGNAL YL |
|---|---|---|
| PWM PHASE | XH | XL |
| LOW PHASE | ALWAYS Lo | ALWAYS Hi |
| HiZ PHASE | ALWAYS Lo | ALWAYS Lo |

(Y: U, V, W)

ROTATION-ANGLE DETECTING DEVICE, IMAGE PROCESSING APPARATUS, AND ROTATION-ANGLE DETECTING METHOD

CROSS-REFERENCE TO RELATED APPLICATIONS

The present application claims priority to and incorporates by reference the entire contents of Japanese Patent Application No. 2013-246949 filed in Japan on Nov. 29, 2013.

BACKGROUND OF THE INVENTION

1. Field of the Invention

The present invention relates to a rotation-angle detecting device for detecting a rotation angle of a rotating body such as a motor, an image processing apparatus, and a rotation-angle detecting method.

2. Description of the Related Art

In an image processing apparatus such as a printer apparatus, a facsimile apparatus, a copying apparatus, a scanner apparatus, or a multifunction peripheral, a drive mechanism is driven by a drive motor, and thereby a unit necessary to perform image processing, such as an image reading operation or an image forming operation, is driven at predetermined speed.

Then, to drive the drive motor to rotate at intended speed, conventionally, the image processing apparatus connects a rotary encoder to a rotating shaft (a rotor) of the drive motor and causes the rotary encoder to output detection signals which are two-phase pulse signals with a quarter-cycle phase difference that varies according to a rotation angle of the rotating shaft, i.e., a rotation angle of the rotary encoder. The image processing apparatus detects a relative rotation angle from edge detection of the two-phase pulse signals and Hi/Lo states of the two phases, and controls a drive-motor driving signal, thereby driving the drive motor to rotate at intended speed.

This rotary encoder is, for example, a two-phase optical encoder including a disk with equally-spaced slits serving as optical windows formed on the periphery thereof and two photointerrupters placed at a distance of a quarter of the slit pitch of the disk. By binarizing signals output from the two photointerrupters, two-phase pulse signals can be obtained.

However, such a rotation-angle detecting device using an optical encoder needs components, such as a disk with slits and photointerrupters, and these components need to be mounted on a drive motor with high accuracy; therefore the rotation-angle detecting device has problems of increases in size and cost.

Accordingly, there has been proposed a magnetic-sensor-signal processing integrated circuit that finds relative rotation angle of two magnetic sensors placed at an offset angle of about 90 degrees relative to a magnetic field by using a vector represented by outputs from the two magnetic sensors, and includes a storage unit that stores therein sines and cosines in increments of a predetermined angle, a unit for rotating the vector in increments of the predetermined angle using the sines and cosines stored in the storage unit, and a unit for detecting a total rotation angle when the rotating unit has rotated the vector to a reference position (see Japanese Patent Application Laid-open No. 2004-191101).

That is, in this conventional technique, to find a relative rotation angle of two magnetic sensors placed at an offset angle of about 90 degrees relative to a magnetic field by using a vector represented by outputs from the two magnetic sensors, sines and cosines are stored in a storage unit in advance in increments of a predetermined angle. Then, the vector is rotated by using the sines and cosines stored in the storage unit, and a total rotation angle of the vector when having been rotated to a reference position is detected.

Incidentally, if an apparatus includes multiple drive motors, the cost can be reduced by using the same type of motors as much as possible. However, when the multiple drive motors are controlled with different resolutions, if control circuits or the like are installed to suit a motor controlled with a high resolution, the control circuit or the like is over-engineered for a low-resolution motor, and many high-performance control circuits are required, which results in an increase in the cost.

Furthermore, if several types of control circuits are installed to suit the different resolutions, the number of types of control circuits is increased, resulting in an increase in the cost as well. For example, in the above-described patent literature (Japanese Patent Application Laid-open No. 2004-191101), when the angle detection is performed with a different resolution for each motor, it is necessary to prepare rotation-angle detecting devices with different resolutions from one another.

In view of the above, there is a need to provide a rotation-angle detecting device capable of supporting multiple resolutions.

SUMMARY OF THE INVENTION

It is an object of the present invention to at least partially solve the problems in the conventional technology.

A rotation-angle detecting device includes: an angle detecting unit that detects a rotation angle of a rotating body on the basis of sinusoidal wave signals that multiple sensors arranged to have a phase difference output according to the rotation angle of the rotating body; and a resolution setting unit that allows change of a resolution of the rotation angle detected by the angle detecting unit.

A rotation-angle detecting method includes: detecting a rotation angle of a rotating body on the basis of sinusoidal wave signals that multiple sensors arranged to have a phase difference output according to the rotation angle of the rotating body; and changing a resolution of the rotation angle detected at the detecting.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 14 is an explanatory diagram showing another example of an output signal FIGS. 15A and 15B are explanatory diagrams showing another example of an output signal;

FIG. 16 is an explanatory diagram showing another example of an output signal;

FIG. 27 is a diagram showing relationship between the phase logic and a gate signal.

DETAILED DESCRIPTION OF THE PREFERRED EMBODIMENTS

First Embodiment

Figure 1:
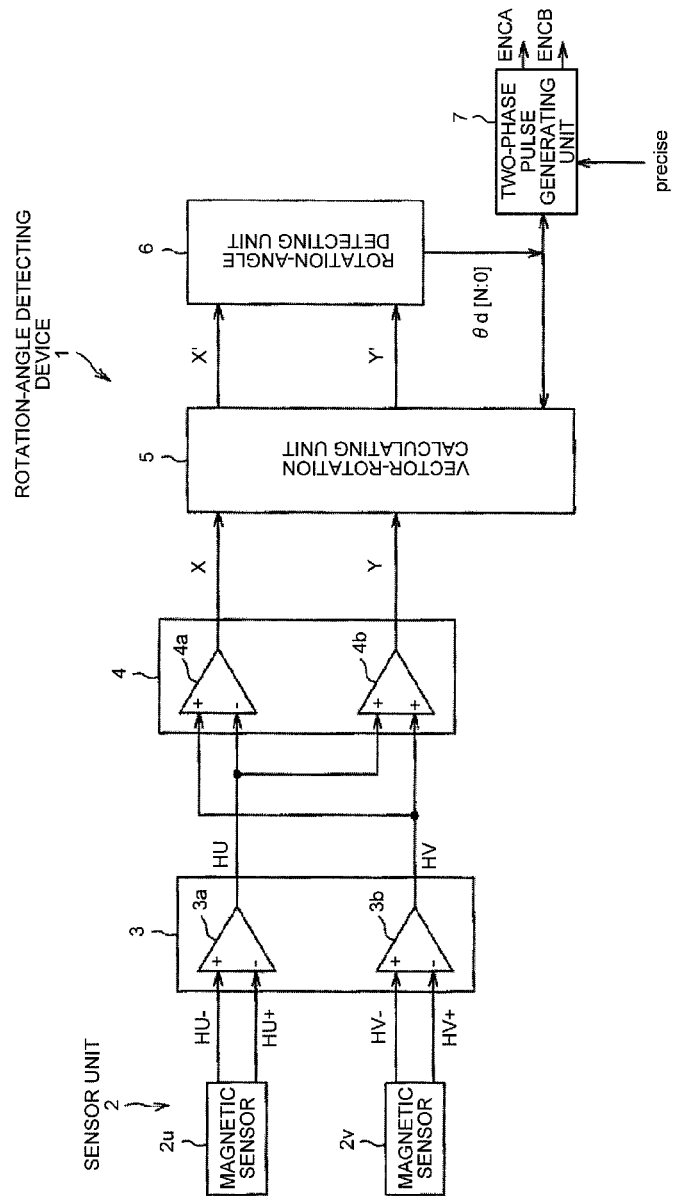
FIG. 1 is a block configuration diagram of a rotation-angle detecting device according to a first embodiment of the present invention.
Figure 2:
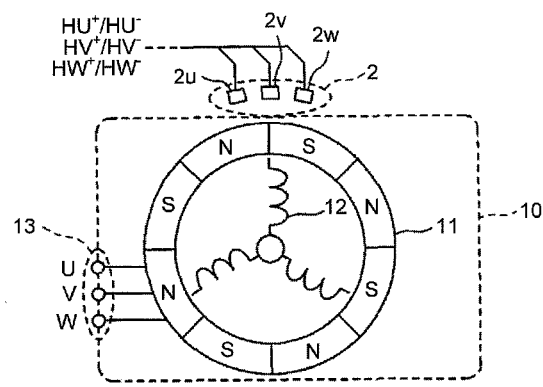
FIG. 2 is a schematic configuration diagram of a DC brushless motor.
Figure 3:
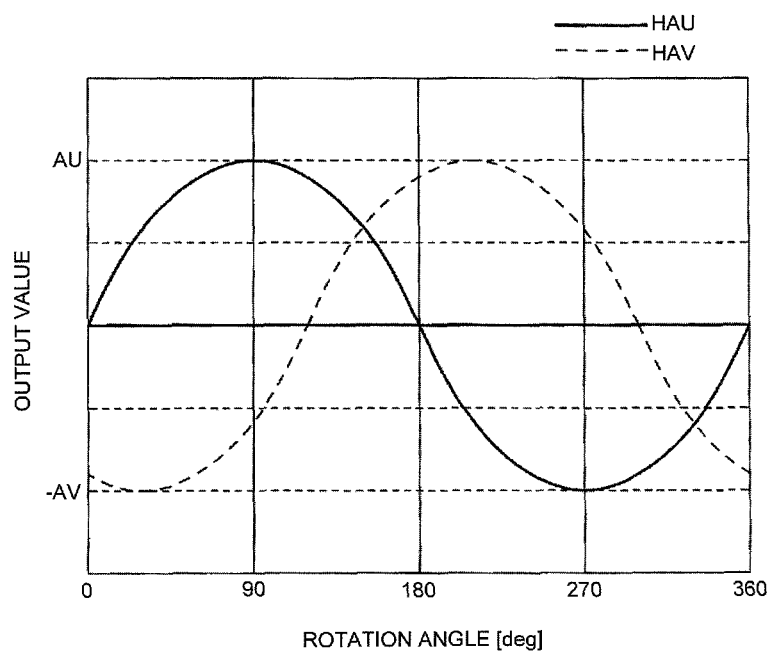
FIG. 3 is a diagram showing an example of UV analog Hall signals.
Figure 4:
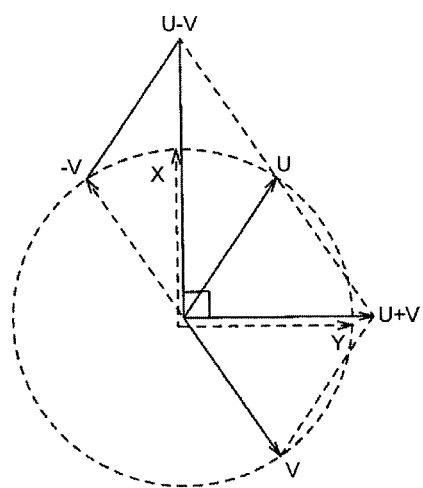
FIG. 4 is an explanatory diagram of a vector generating process performed by a vector-component generating unit shown in FIG. 1.
Figure 5:
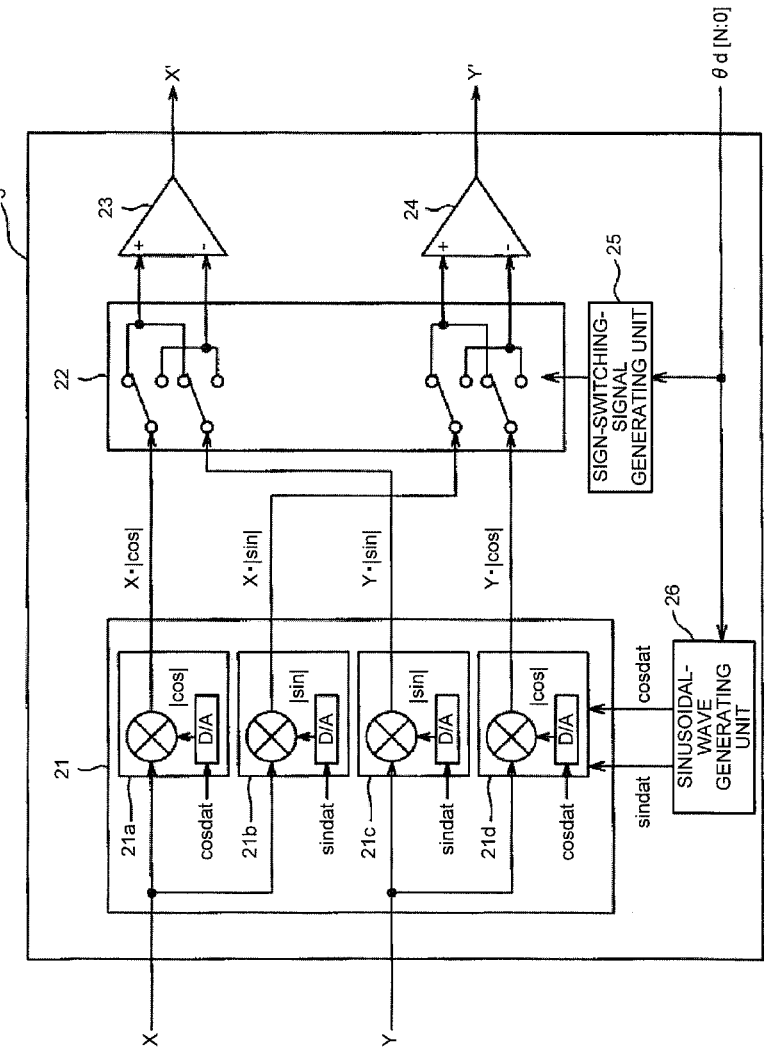
FIG. 5 is a circuit configuration diagram of a vector-rotation calculating unit shown in FIG. 1.
Figure 6:
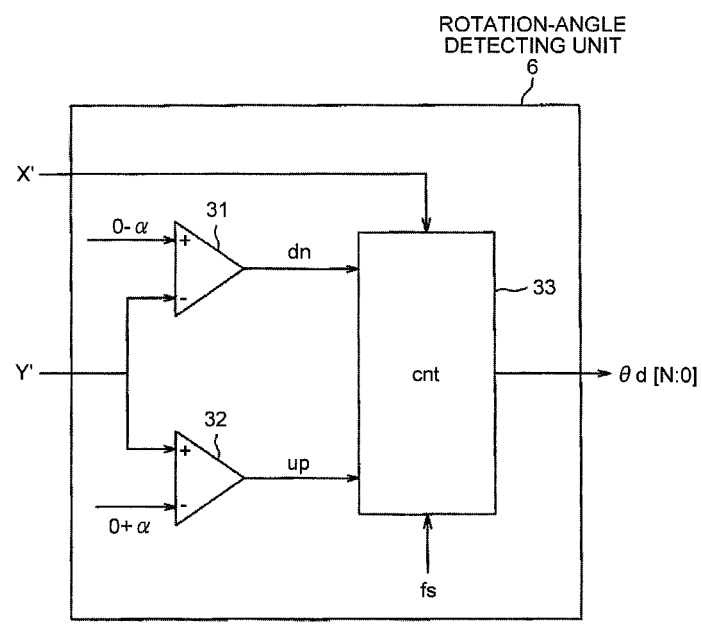
FIG. 6 is a circuit configuration diagram of a rotation-angle detecting unit shown in FIG. 1.
Figures 7A, 7B, 8:
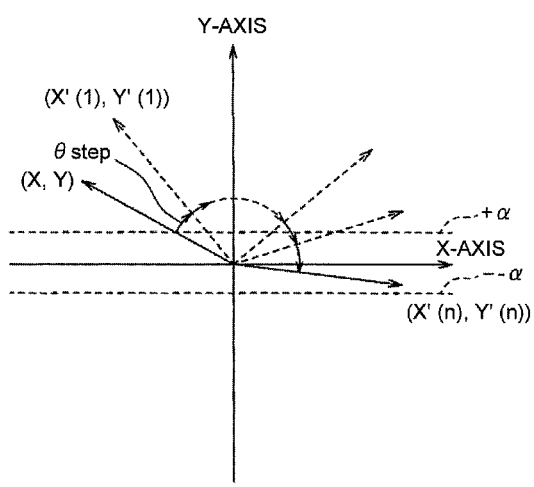
FIGS. 7A and 7B are diagrams showing logic of generating two-phase pulse signals.
FIG. 8 is an explanatory diagram of an initial-rotation-angle detecting process.
Figure 9:
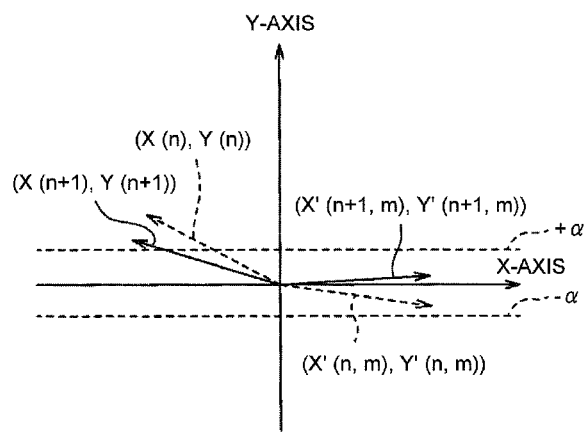
FIG. 9 is an explanatory diagram of a rotor vector and a rotational transformed vector at rotation by an (n+1)th trigger.
Figure 10:
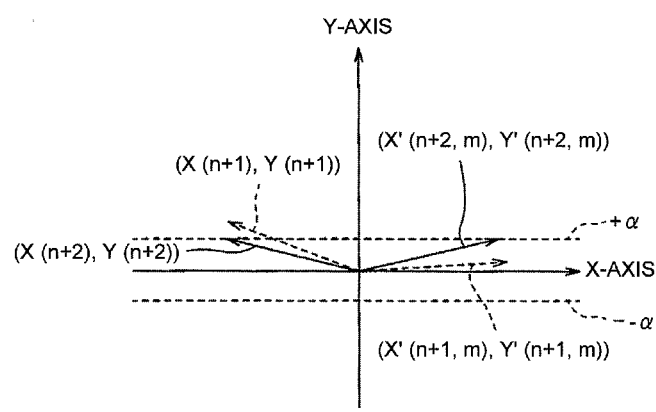
FIG. 10 is an explanatory diagram of the rotor vector and the rotational transformed vector at rotation by an (n+2)th trigger.
Figure 11:
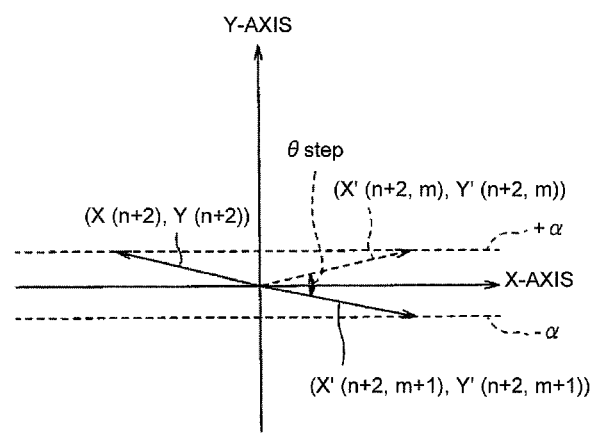
FIG. 11 is an explanatory diagram of rotational transform of the rotational transformed vector with rotation by a unit rotation angle.
Figure 12:
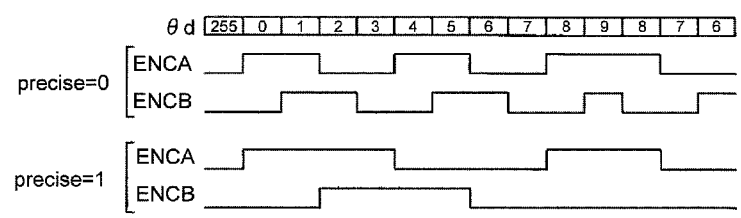
FIG. 12 is a waveform diagram showing an example of waveforms of two-phase pulse signals output from the rotation-angle detecting device shown in FIG. 1.
Figure 13:
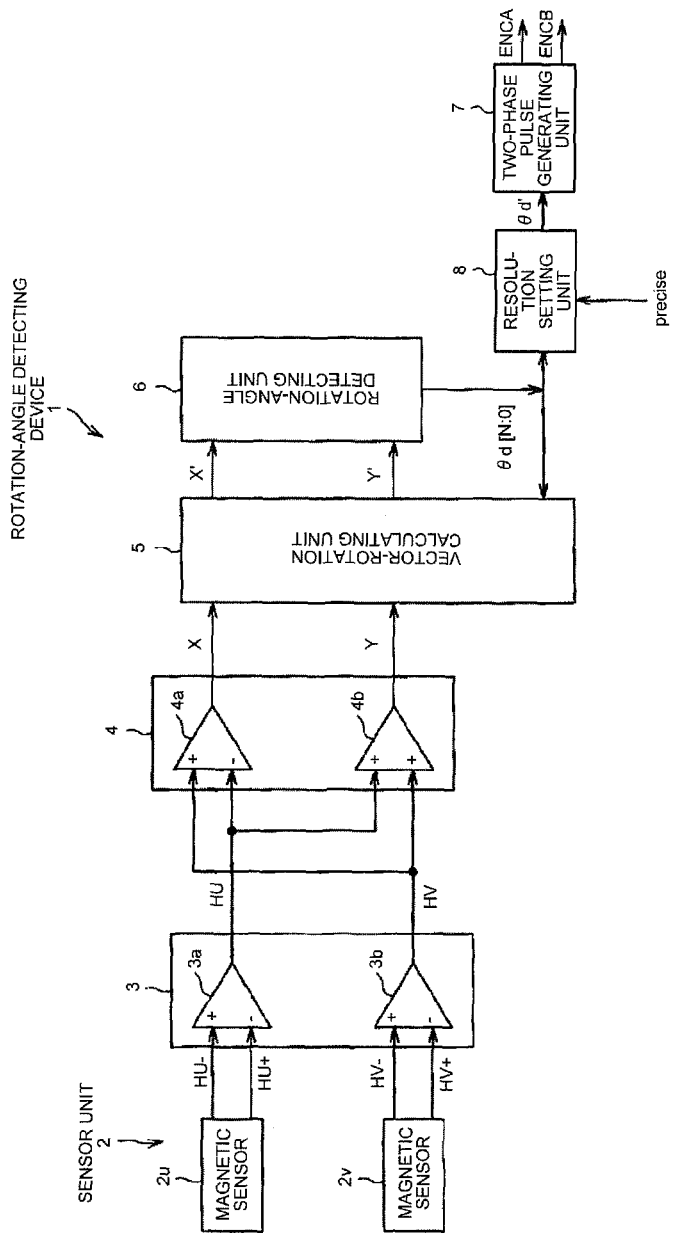
FIG. 13 is a block configuration diagram of a rotation-angle detecting device according to a variation of the first embodiment.

A first embodiment of the present invention is explained below with reference to FIGS. 1 to 16. FIG. 1 is a block configuration diagram of a rotation-angle detecting device according to the first embodiment of the present invention. FIG. 2 is a schematic configuration diagram of a DC brushless motor. FIG. 3 is a diagram showing an example of UV analog Hall signals. FIG. 4 is an explanatory diagram of a vector generating process performed by a vector-component generating unit shown in FIG. 1. FIG. 5 is a circuit configuration diagram of a vector-rotation calculating unit shown in FIG. 1. FIG. 6 is a circuit configuration diagram of a rotation-angle detecting unit shown in FIG. 1. FIGS. 7A and 7B are diagrams showing logic of generating two-phase pulse signals. FIG. 8 is an explanatory diagram of an initial-rotation-angle detecting process. FIG. 9 is an explanatory diagram of a rotor vector and a rotational transformed vector at rotation by an (n+1)th trigger. FIG. 10 is an explanatory diagram of the rotor vector and the rotational transformed vector at rotation by an (n+2)th trigger. FIG. 11 is an explanatory diagram of rotational transform of the rotational transformed vector with rotation by a unit rotation angle. FIG. 12 is a waveform diagram showing an example of waveforms of two-phase pulse signals output from the rotation-angle detecting device shown in FIG. 1. FIG. 13 is a block configuration diagram of a rotation-angle detecting device according to a variation of the first embodiment. FIG. 14 is an explanatory diagram showing another example of an output signal. FIGS. 15A and 15B are explanatory diagrams showing another example of an output signal. FIG. 16 is an explanatory diagram showing another example of an output signal.

A rotation-angle detecting device 1 according to the present embodiment is shown in FIG. 1. In FIG. 1, the rotation-angle detecting device 1 includes a differential unit 3 to which a signal is input from a sensor unit 2, a vector generating unit 4, a vector-rotation calculating unit 5, a rotation-angle detecting unit 6, and a two-phase pulse generating unit 7.

The sensor unit 2 is mounted on a DC brushless motor 10 shown in FIG. 2, and includes three magnetic sensors (rotation detecting unit) 2u, 2v, and 2w.

That is, the rotation-angle detecting device 1 detects a rotation angle of a rotor 11 which is a rotating body of the DC brushless motor 10.

Then, the DC brushless motor 10 includes, as shown in FIG. 2, a three-phase coil 12 and the rotor 11. The coil 12 is generally composed of Y-connected coils in three phases: U, V, and W-phases having a 120-degree phase difference. The rotor 11 is permanent magnets arranged to be opposed to the coil 12 and to alternate the S and N poles thereof. U, V, and W-phase drive currents are appropriately commutated from terminals 13 according to the angle of the rotor 11, and thereby the DC brushless motor 10 is driven to rotate. Incidentally, to drive the rotor 11, the DC brushless motor 10 needs to apply voltage at right angle to the direction of outputting differential signals detected by the magnetic sensors 2u, 2v, and 2w and to the direction of a magnetic flux to drive the rotor 11; however, an illustration of this is omitted in FIG. 2.

The rotation-angle detecting device 1 and the DC brushless motor 10 are applied to an image processing apparatus such as a multifunction peripheral, and a drive mechanism of the image processing apparatus is connected to a rotating shaft (not shown) which is the rotor 11.

Then, the magnetic sensors 2u, 2v, and 2w use, for example, a Hall element, and are fixedly placed in predetermined positions near the rotor 11. The magnetic sensors 2u, 2v, and 2w output U, V, and W-phase differential signals (detection signals) HU+/HU−, HV+/HV−, and HW+/HW− which vary with the magnetic field of the rotor 11, respectively. The magnetic sensors 2u, 2v, and 2w are fixedly placed in positions where analog Hall signals HAU, HAV, and HAW obtained by single-ending the differential signals HU+/HU−, HV+/HV−, and HW+/HW− and converting the single ended signals into analog form sinusoidal waves have a 120-degree phase difference from one another. Incidentally, in the present embodiment, the number of magnetic poles of the rotor 11 of the DC brushless motor 10 being a detection target is "8" (4 pairs); however, the number of magnetic poles is not limited to "8".

That is, when the differential signals HU+/HU−, HV+/HV−, and HW+/HW− have been single-ended (converted to a signal of "L" or "H" according to the voltage level using the ground (0V) as the reference), the differential signals HU+/HU−, HV+/HV−, and HW+/HW− vary sinusoidally with respect to the rotation angle of the rotor 11.

In the present embodiment, the rotation angle of the rotor 11 is detected by using only the differential signals HU+/HU− and HV+/HV− output from the magnetic sensors $2u$ and $2v$. When the differential signals HU+/HU− and HV+/HV− have been single-ended, sinusoidal waveforms shown in FIG. 3 are obtained. That is, the magnetic sensors $2u$, $2v$, and $2w$, which are multiple sensors arranged to have a phase difference from one another, each output a sinusoidal signal.

The above-described analog Hall signals HAU, HAV, and HAW can be represented by the following equation (1).

$$\left. \begin{array}{l} HU = HU^+ - HU^- = A * \sin(\theta) \\ HV = HU^+ - HU^- = A * \sin\left(\theta - \frac{2}{3}\pi\right) \\ HW = HW^+ - HV^- = A * \sin\left(\theta + \frac{2}{3}\pi\right) \end{array} \right\} \quad (1)$$

In the present embodiment, the number of magnetic poles of the rotor 11 of the DC brushless motor 10 is "8"; therefore, the sinusoidal waveforms shown in FIG. 3 have four wave cycles per revolution of the rotor 11, and a quarter revolution of the rotor 11 corresponds to one sinusoidal wave cycle shown in FIG. 3. Incidentally, in the following description, an angle $\theta$ is indicated such that one sinusoidal wave cycle corresponds to 360 degrees, and this angle $\theta$ is treated as the angle of the rotor 11.

As described above, the sensor unit 2 shown in FIG. 1 includes the U-phase magnetic sensor $2u$ and the V-phase magnetic sensor $2v$, and the magnetic sensors $2u$ and $2v$ output differential signals HU+/HU− and HV+/HV−, which vary sinusoidally according to the rotation angle $\theta$ of the rotor 11, to the differential unit 3, respectively.

The differential unit 3 includes differential amplifiers $3a$ and $3b$. The differential signal HU+/HU− is input from the magnetic sensor $2u$ to the differential amplifier $3a$, and the differential signal HV+/HV− is input from the magnetic sensor $2v$ to the differential amplifier $3a$.

The differential amplifier $3a$ single-ends the differential signal HU+/HU− as described above, and outputs an analog Hall signal HU, which varies sinusoidally according to the rotation angle $\theta$ of the rotor 11, to the vector generating unit 4.

The differential amplifier $3b$ single-ends the differential signal HV+/HV− as described above, and outputs an analog Hall signal HV, which varies sinusoidally according to the rotation angle $\theta$ of the rotor 11, to the vector generating unit 4.

The vector generating unit 4 includes a subtracting amplifier $4a$ and a summing amplifier $4b$. The analog Hall signal HV is input to a plus terminal of the subtracting amplifier $4a$, and the analog Hall signal HU is input to a minus terminal of the subtracting amplifier $4a$. The subtracting amplifier $4a$ subtracts the analog Hall signal HU from the analog Hall signal HV, thereby generating a rotor vector component X, and outputs the generated rotor vector component X to the vector-rotation calculating unit 5. The analog Hall signals HV and HU are input to respective plus terminals of the summing amplifier $4b$. The subtracting amplifier $4a$ sums up the analog Hall signals HV and HU, thereby generating a rotor vector component Y, and outputs the generated rotor vector component Y to the vector-rotation calculating unit 5. A vector represented by the rotor vector components X and Y is hereinafter referred to as a rotor vector (a detection vector).

That is, the vector generating unit 4 performs a calculation of the following equation (2) with the subtracting amplifier $4a$, thereby generating a rotor vector component X (hereinafter, may also be referred to as an X-axis component X of the rotor vector accordingly).

$$\left. \begin{array}{l} X = \frac{(HU - HV)}{\sqrt{3}} \\ = A * \cos(\theta) \end{array} \right\} \quad (2)$$

Furthermore, the vector generating unit 4 performs a calculation of the following equation (3) with the summing amplifier $4b$, thereby generating a rotor vector component Y (hereinafter, may also be referred to as a Y-axis component Y of the rotor vector accordingly).

$$\left. \begin{array}{l} Y = HU + HV \\ = A * \sin(\theta) \end{array} \right\} \quad (3)$$

That is, the vector generating unit 4 sets unit vectors U and V on the XY plane shown in FIG. 4; the length of the vector U on U-axis at a −30 degree angle to X-axis is "1", and the length of the vector V on V-axis at a −60 degree angle to Y-axis is "1". On the X and Y axes and the U and V axes, a vector (U+V) is a unit vector on the Y-axis, and a vector (U−V) is a vector on the X-axis and has a length of $\sqrt{3}$. Then, the above equations (2) and (3) show coordinate transformation from a 120-degree U−V coordinate system to an X−Y coordinate system, and (HU−HV) is multiplied by $1/\sqrt{3}$ to equalize the after-transformation lengths. That is, resistance or the like (not shown) is set in the vector generating unit 4 so that the gain of the subtracting amplifier $4a$ is $1/\sqrt{3}$.

The vector-rotation calculating unit (rotation-vector generating unit, sinusoidal-wave generating unit) 5 includes, as shown in FIG. 5, a multiplying unit 21, an input-terminal switching unit 22, an adder-subtractor unit 23, a variable-gain adder-subtractor unit 24, a sign-switching-signal generating unit 25, and a sinusoidal-wave generating unit 26. The rotor vector components X and Y from the vector generating unit 4 and a detected angle $\theta d$ detected by the rotation-angle detecting unit 6 are input to the vector-rotation calculating unit 5.

The sinusoidal-wave generating unit 26 includes a nonvolatile memory such as a read-only memory (ROM), and data (sinusoidal wave data) of sinusoidal amplitude values in increments of a predetermined unit rotation angle (reference unit angle) $\theta step$ ($=2\pi/(2^N)$) has been stored in the nonvolatile memory in advance. Incidentally, in the present embodiment, the reference unit angle is set to $\theta step=2\pi/(2^8)$, and the detection resolution at the reference unit angle is 8. Furthermore, "$2^8$" denotes eighth power of two. Then, the sinusoidal-wave generating unit 26 receives a detected angle θd, and retrieves sinusoidal wave data sindat (reference sinusoidal wave data) stored in the non-volatile memory on the basis of the detected angle θd, and then outputs the sinusoidal wave data sindat and cosine wave data cosdat to the multiplying unit 21.

The sign-switching-signal generating unit 25 generates a sign switching signal sign according to θd[N:N−1] out of the detected angle θd[N:0] output from the rotation-angle detecting unit 6 to be described later, and outputs the generated sign switching signal sign to the input-terminal switching unit 22.

The multiplying unit 21 is composed of four resistance-ladder multiplying digital-to-analog convertors (DACs) 21a to 21d arranged in parallel. The rotor vector components X and Y are input from the subtracting amplifier 4a and the summing amplifier 4b of the vector generating unit 4 to the multiplying unit 21, respectively. A detected angle θd input from the rotation-angle detecting unit 6 is a digital value, so a DAC is necessary to convert the detected angle θd into an analog amplitude value of a trigonometric function used in multiplication. Therefore, in the present embodiment, the resistance-ladder multiplying DACs 21a to 21d, which each have a DAC and a multiplier, are used. The resistance-ladder multiplying DACs 21a to 21d have a simple configuration using a resistance and a switch, and are more simple and inexpensive than a configuration using a DAC and an analog multiplier. Furthermore, if a monolithic integrated circuit (IC) is used, resistance values can be made uniform with high accuracy, and high-precision multiplication can be performed as compared with the case of using an analog multiplier. Moreover, the resistance-ladder multiplying DACs 21a to 21d in the present embodiment use unipolar mode, and therefore are further more simple and inexpensive. Incidentally, when the unipolar mode is used in the resistance-ladder multiplying DACs 21a to 21d, negative multiplication essential for trigonometric multiplication cannot be performed; however, to cope with this, the subsequent input-terminal switching unit 22 switches input signals to the adder-subtractor unit 23 and the variable-gain adder-subtractor unit 24.

The multiplying unit 21 performs a calculation based on the sinusoidal wave data sindat and cosine wave data cosdat input from the sinusoidal-wave generating unit 26, and outputs a result of the calculation to the input-terminal switching unit 22. That is, the multiplying unit 21 multiplies an analog sinusoidal absolute value |sin| and analog cosine absolute value |cos| changed to analog values in proportion to respective values, by the X-axis component X and Y-axis component Y of the rotor vector input from the vector generating unit 4, and outputs obtained X·|sin|, X·|cos|, Y·|sin|, and Y·|cos| to the input-terminal switching unit 22.

The input-terminal switching unit 22 uses a multiplexer and/or the like, and receives X·|sin|, X·|cos|, Y·|sin|, and Y·|cos| from the multiplying unit 21, and also receives the sign switching signal sign generated according to θd[N:0] from the sign-switching-signal generating unit 25. In accordance with this sign switching signal sign, the input-terminal switching unit 22 switches X·|sin|, X·|cos|, Y·|sin|, and Y·|cos| to be input to a normal-phase or reversed-phase input terminal of the adder-subtractor unit 23 or the variable-gain adder-subtractor unit 24.

X·|cos| and Y·|sin|, which are a result of the multiplication by the multiplying unit 21, are input to normal-phase and reversed-phase input terminals of the adder-subtractor unit 23 while being switched through the input-terminal switching unit 22. The adder-subtractor unit 23 performs an addition/subtraction calculation of X·|cos| and Y·|sin|, and outputs a result of the calculation as a converted X-axis component X' of a rotational transformed vector.

X·|sin| and Y·|cos|, which are a result of the multiplication by the multiplying unit 21, are input to normal and reversed-phase input terminals of the variable-gain adder-subtractor unit 24 while being switched through the input-terminal switching unit 22. The variable-gain adder-subtractor unit 24 performs an addition/subtraction calculation of X·|sin| and Y·|cos| and then performs multiplication of a predetermined gain, and outputs a result of the calculation as a converted Y-axis component Y' of the rotational transformed vector.

That is, the vector-rotation calculating unit 5 performs a calculation of the following equation (4) on the rotor vector components X and Y input from the vector generating unit 4, thereby generating a converted X-axis component X' and a converted Y-axis component Y', and outputs the converted X-axis component X' and the converted Y-axis component Y' to the rotation-angle detecting unit 6.

$$\begin{pmatrix} V_{x'} \\ V_{y'} \end{pmatrix} = \begin{pmatrix} \cos\theta r & \sin\theta r \\ -\sin\theta r & \cos\theta r \end{pmatrix} \begin{pmatrix} V_x \\ V_y \end{pmatrix} \qquad (4)$$

Specifically, for example, when the detected angle θd is a value corresponding to the third quadrant (180 to 270 degrees), respective trigonometric functions to be multiplied by the rotor vector components X and Y are −|sin θd| and −|cos θd|. In this case, to cause the vector-rotation calculating unit 5 to achieve the calculation of the converted X-axis component X' and the converted Y-axis component Y', the input-terminal switching unit 22 needs to switch the input destinations as follows.

That is, the input-terminal switching unit 22 inputs X·|cos θd| to the reversed-phase input terminal of the adder-subtractor unit 23 to serve as (X·(−|cos θd|), and inputs Y·|sin θd| to the reversed-phase input terminal of the adder-subtractor unit 23 to serve as (Y·(−|sin θd|).

Then, the adder-subtractor unit 23 calculates X'=(X·(−|cos θd|)+(Y·(−|sin θd|). In this case, a sign relationship is identical.

Furthermore, the input-terminal switching unit 22 inputs X·|sin θd| to the normal-phase input terminal of the variable-gain adder-subtractor unit 24 to serve as X·|sin θd|=−X·(−|sin θd|), and inputs Y·|cos θd| to the reversed-phase input terminal of the variable-gain adder-subtractor unit 24 to serve as Y·(−|cos θd|).

Then, the variable-gain adder-subtractor unit 24 calculates Y'=−X·(−|sin θd|)+Y·(−|cos θd|). In this case, a sign relationship is identical.

That is, the vector-rotation calculating unit 5 generates a rotational transformed vector (a rotated vector) by rotating a rotor vector (X, Y), which is a detection vector, in increments of a unit rotation angle θstep, which is an angle greater than the reference unit angle and is used as a processing unit angle, on the basis of sinusoidal wave data sindat in the non-volatile memory 27 depending on the unit rotation angle θstep and the rotor vector (X, Y). Incidentally, in the above-described configuration, the input-terminal switching unit 22 and the sign-switching-signal generating unit 25 are placed between the multiplying unit 21 and the adder-subtractor unit 23/the variable-gain adder-subtractor unit 24; however, the input-terminal switching unit 22 and the sign-switching-signal generating unit 25 can be placed in front of the differential amplifiers 3a and 3b of the differential unit 3 or in front of the subtracting/summing amplifiers 4a and 4b of the vector generating unit 4.

Then, the rotation-angle detecting unit (angle search unit) 6 has a circuit configuration as shown in FIG. 6, and includes comparators 31 and 32 and a repeat counter 33. The converted Y-axis component Y' is input to the comparators 31 and 32 of the rotation-angle detecting unit 6, and two reference values +α and −α are input to the comparators 31 and 32, respectively. Furthermore, the converted X-axis component X' and a detection trigger fs are input to the repeat counter 33 of the rotation-angle detecting unit 6, and a count-down command dn and a count-up command up, which are comparison results of the comparators 31 and 32, are input to the repeat counter 33.

The comparator (determining unit) 31 compares the converted Y-axis component Y' with the reference value −α, and sets the count-down command dn to Hi if the converted Y-axis component Y' is less than the reference value −α (Y'<−α), or sets the count-down command dn to Lo if the converted Y-axis component Y' exceeds the reference value −α (Y'>−α).

The comparator (determining unit) 32 compares the converted Y-axis component Y' with the reference value +α, and sets the count-up command up to Hi if the converted Y-axis component Y' exceeds the reference value +α (Y'>+α), or sets the count-up command up to Lo if the converted Y-axis component Y' is less than the reference value +α (Y'<−α).

That is, the comparators 31 and 32 determine whether the converted Y-axis component Y' of the rotated vector is located within a dead zone ±α.

Each time a detection trigger fs is input, the repeat counter 33 performs count-up and count-down of the detected angle θd[N:0] in response to the count-down command do from the comparator 31 and the count-up command up from the comparator 32. In the present embodiment, the count width of the repeat counter 33 is 8 bits. Therefore, a detected angle θd[7:0] is output to the two-phase pulse generating unit 7 and the vector-rotation calculating unit 5. That is, this detected angle θd[7:0] corresponds to a rotation angle.

If the count-up command up=Lo and the count-down command dn=Hi, the repeat counter 33 decrements a count value of the detected angle θd by one. That is, in a state where the converted Y-axis component Y' is smaller than the dead zone, if a rotation calculation is performed on the basis of the detected angle θd, the rotor vector rotates by the unit rotation angle θstep in a counterclockwise direction with respect to the X-axis.

Furthermore, if the count-up command up=Lo and the count-down command dn=Lo, the repeat counter 33 maintains the detected angle θd. That is, in a state where the converted Y-axis component Y' is located within the dead zone, if a rotation calculation is performed on the basis of the detected angle θd, the rotor vector does not rotate.

Then, if the count-up command up=Hi and the count-down command dn=Hi, the repeat counter 33 determines that there is an error because this state cannot occur in general.

The rotation-angle detecting device 1 causes the vector-rotation calculating unit 5 to feed back the detected angle θd detected by the rotation-angle detecting unit 6 and perform a rotation calculation based on a value of the detected angle θd, thereby rotating the rotational transformed vector in increments of the unit rotation angle θstep toward the target X-axis, and, after the rotational transformed vector has been rotated close to the X-axis, causing the rotational transformed vector to constantly follow the X-axis.

The two-phase pulse generating unit 7 receives the detected angle θd from the rotation-angle detecting unit 6 and a resolution switching signal precise from the outside, and generates two-phase pulses ENCA and ENCB at a resolution based on 2 bits of the detected angle θd determined by the resolution switching signal precise. In the present embodiment, there are two types of resolutions of 8 bits (=dividing one cycle into 256) and 7 bits (=dividing one cycle into 127). That is, a resolution of either 8 bits or 7 bits is set.

The two-phase pulses ENCA and ENCB are generated, for example, by logic shown in FIGS. 7A and 7B. FIG. 7A shows logic when a resolution switching signal precise is Lo (0), i.e., in a case of a high resolution (8 bits). In the case of the high resolution, two-phase pulses ENCA and ENCB are generated on the basis of a value of θd[1:0].

On the other hand, FIG. 7B shows logic when a resolution switching signal precise is Hi (1), i.e., in a case of a low resolution (7 bits). In the case of the low resolution, two-phase pulses ENCA and ENCB are generated on the basis of a value of θd[2:1]. Incidentally, the number of types of resolutions may be more than two. Furthermore, when a bit count of the detected angle θd (the count width of the repeat counter 33) is more than 8 bits, a resolution comes to correspond to the bit count is set.

In this way, the resolution at the detected angle θd can be changed. That is, the two-phase pulse generating unit 7 serves as a resolution setting unit that allows change of the resolution. Furthermore, the two-phase pulse generating unit 7 also serves as an output unit for converting the rotation angle to a prescribed output signal on the basis of the resolution set by the resolution setting unit and outputting the prescribed output signal. Then, the resolution switching signal precise works as a control signal for changing the resolution of the resolution setting unit.

Incidentally, in the present embodiment, the multiplying unit 21 of the vector-rotation calculating unit 5 is composed of the four resistance-ladder multiplying DACs 21a to 21d arranged in parallel; however, the configuration of the multiplying unit 21 is not limited to this, and can be configured, for example, to use one multiplier alternately in chronological order.

Subsequently, the action of the present embodiment is explained. The rotation-angle detecting device 1 according to the present embodiment can detect a rotation angle of the rotor 11 at any of easily-switchable different resolutions and at low cost without increasing the configuration.

The rotation-angle detecting device 1 detects a rotation angle of the rotor 11 of the DC brushless motor 10 including the magnetic sensors 2u, 2v, and 2w which output differential signals HU+/HU−, HV+/HV−, and HW+/HW−, respectively. That is, the rotation-angle detecting device 1 calculates a rotated vector of the rotor 11 from differential signals output from the magnetic sensors 2u and 2v out of the magnetic sensors 2u, 2v, and 2w, and detects a rotation angle of the rotor 11 on the basis of the rotated vector.

That is, the rotation-angle detecting device 1 is connected to the magnetic sensors 2u and 2v of the DC brushless motor 10. The differential signal HU+/HU− output from the U-phase magnetic sensor 2u is input to the differential amplifier 3a of the differential unit 3 of the rotation-angle detecting device 1, and the V-phase differential signal HV+/HV− is input to the differential amplifier 3b.

The differential amplifier 3a of the differential unit 3 single-ends the differential signal HU+/HU−, and outputs an analog Hall signal HU, which varies sinusoidally according to the rotation angle θ of the rotor 11, to the vector generating unit 4. Furthermore, the differential amplifier 3*b* of the differential unit 3 single-ends the differential signal HV+/HV−, and outputs an analog Hall signal HV, which varies sinusoidally according to the rotation angle θ of the rotor 11, to the vector generating unit 4.

The subtracting amplifier 4*a* of the vector generating unit 4 subtracts the analog Hall signal HU from the analog Hall signal HV, thereby generating a rotor vector component X, and outputs the generated rotor vector component X to the vector-rotation calculating unit 5. The summing amplifier 4*b* of the vector generating unit 4 sums up the analog Hall signals HV and HU, thereby generating a rotor vector component Y, and outputs the generated rotor vector component Y to the vector-rotation calculating unit 5. That is, the vector generating unit 4 performs a calculation of the above-described equation (2) with the subtracting amplifier 4*a*, thereby generating a rotor vector component X, and performs a calculation of the above-described equation (3) with the summing amplifier 4*b*, thereby generating a rotor vector component Y.

Then, the vector-rotation calculating unit 5 performs a calculation of the above-described equation (4) on the rotor vector components X and Y input from the vector generating unit 4, thereby generating a converted X-axis component X' and a converted Y-axis component Y', and outputs the converted X-axis component X' and the converted Y-axis component Y' to the rotation-angle detecting unit 6.

In this vector-rotation calculating unit 5, the resistance-ladder multiplying DACs 21*a* to 21*d* of the multiplying unit 21 perform a calculation based on the sinusoidal wave data sindat and cosine wave data cosdat input from the sinusoidal-wave generating unit 26, and outputs a result of the calculation to the input-terminal switching unit 22. That is, the resistance-ladder multiplying DACs 21*a* to 21*d* multiply an analog sinusoidal absolute value |sin| and analog cosine absolute value |cos| changed to analog values in proportion to respective values by the X-axis component X and Y-axis component Y of the rotor vector input from the vector generating unit 4, and output obtained X·|sin|, X·|cos|, Y·|sin|, and Y·|cos| to the input-terminal switching unit 22.

That is, as described above, the non-volatile memory included in the sinusoidal-wave generating unit 26 has stored therein sinusoidal wave data sindat(n) corresponding to a resolution at a reference unit angle. In the present embodiment, the resolution at the reference unit angle is 8 bits, and, for example, sinusoidal wave data sindat(n) for a quarter of a cycle has been stored in the non-volatile memory. The sinusoidal-wave generating unit 26 directly refers to the sinusoidal wave data sindat(n) stored in the non-volatile memory, and retrieves and output the sinusoidal wave data sindat(n) to the multiplying unit 21. For example, the sinusoidal-wave generating unit 26 retrieves sindat(1) when the detected angle θd=000001 or retrieves sindat(8) when the detected angle θd=001000 from the non-volatile memory, and outputs the retrieved data to the multiplying unit 21. Incidentally, a value of sinusoidal wave data sindat (n) retrieved when θd>64 can be obtained from sinusoidal wave data sindat(0 to 64) by using the symmetry of a sinusoidal wave. Then, as for cosine wave data cosdat, likewise, a value of cosine wave data cosdat can be obtained from the sinusoidal wave data sindat(0 to 64) by using the symmetry of a sinusoidal wave. The sinusoidal wave data sindat and cosine wave data cosdat are output to the multiplying unit 21 in this way.

In accordance with θd[N:0] input from the sign-switching-signal generating unit 25, the input-terminal switching unit 22 inputs X·|sin|, X·|cos|, Y·|sin|, and Y·|cos| input from the multiplying unit 21, to the normal-phase or reversed-phase input terminal of the adder-subtractor unit 23 or the variable-gain adder-subtractor unit 24 in a switched manner.

The adder-subtractor unit 23 performs an addition/subtraction calculation of X·|cos| and Y·|sin|, which are a result of the multiplication by the multiplying unit 21, and outputs a result of the calculation as a converted X-axis component X' to the rotation-angle detecting unit 6.

The variable-gain adder-subtractor unit 24 performs an addition/subtraction calculation of X·|sin| and Y·|cos|, which are a result of the multiplication by the multiplying unit 21, and then performs multiplication of a predetermined gain, and outputs a result of the calculation as a converted Y-axis component Y' to the rotation-angle detecting unit 6.

That is, the vector-rotation calculating unit 5 performs a calculation of the above-described equation (4) on the rotor vector components X and Y input from the vector generating unit 4, thereby generating a converted X-axis component X' and a converted Y-axis component Y', and outputs the converted X-axis component X' and the converted Y-axis component Y' to the rotation-angle detecting unit 6.

Then, the rotation-angle detecting unit 6 of the rotation-angle detecting device 1 according to the present embodiment detects a rotation angle θ of the rotor 11 on the basis of a result of the calculation by the vector-rotation calculating unit 5, and outputs the rotation angle θ as a detected angle θd.

First, detection of an initial rotation angle is explained. The rotation-angle detecting unit 6 performs an initial-rotation-angle detecting process during a suspension period from when the DC brushless motor 10 and the rotation-angle detecting device 1 are powered ON until rotation of the rotor 11 is started. Incidentally, when the cycle of execution of a trigger fs is sufficiently slow as compared to the rotation speed of the rotor vector, even if the rotation of the rotor 11 has been started, the initial-rotation-angle detecting process can be performed at the time of initial rotation.

As shown in FIG. 8, in the initial-rotation-angle detecting process, a rotor vector component X, a rotor vector component Y, a converted X-axis component X', and a converted Y-axis component Y' rotate in increments of the unit rotation angle θstep in response to each trigger fs, and until an (n−1)th trigger fs, the converted Y-axis component Y' is larger than a reference value α. Therefore, the rotation-angle detecting unit 6 counts up the detected angle θd, and rotates the converted X-axis component X' and the converted Y-axis component Y' clockwise in increments of the unit rotation angle θstep to approach the X-axis by a rotational operation.

However, in the initial-rotation-angle detecting process, if a rotated vector is located within a dead zone ±α at 180 degrees, the rotation-angle detecting unit 6 does not start the initial-rotation-angle detecting process. Therefore, at the start of the initial-rotation-angle detecting process, if the rotor vector component X (X'(0)<0, the rotation-angle detecting unit 6 increments a count value of the repeat counter 33 for counting the rotation angle θ by 2^(N−1).

Then, when the rotational transformed vector (X', Y') falls within the dead zone ±α by an nth trigger fs and the initial-rotation-angle detecting process is completed, as shown in FIGS. 9 to 11, the rotation-angle detecting unit 6 performs a rotation-start-time rotation-angle detecting process when rotation of the rotor 11 has started. Incidentally, in the following description, when a rotational transformed vector (X'(n, m), Y'(n, m)) is written, it indicates that a detected angle θd is m (θd=m).

When the above conditions are satisfied, when an (n+1)th trigger fs has been input after the input of the nth trigger fs, as shown in FIG. 9, a rotor vector (X(n), Y(n)) is rotated to a rotor vector (X(n+1), Y(n+1)) in accordance with the rotation of the rotor 11.

When the rotor vector (X(n), Y(n)) has been rotated to the rotor vector (X(n+1), Y(n+1)), as shown in FIG. 9, a rotational transformed vector (X'(n, m), Y'(n, m)) is rotated to a rotational transformed vector (X'(n+1, m), Y'(n+1, m)).

However, at the point of time when the (n+1)th trigger fs has been input, the converted Y-axis component Y'(n+1, m) is within the dead zone ±α (−α<Y', (n+1, m)<+α) as shown in FIG. 9. Therefore, the rotation-angle detecting unit 6 does not perform a rotational operation.

Then, when an (n+2)th trigger fs has been input, as shown in FIG. 10, the rotor vector (X(n+1), Y(n+1)) is rotated to a rotor vector (X(n+2), Y(n+2)) in accordance with the rotation of the rotor 11.

When the rotor vector (X(n+1), Y(n+1)) has been rotated to the rotor vector (X(n+2), Y(n+2)), as shown in FIG. 10, the rotational transformed vector (X'(n+1, m), Y'(n+1, m)) is rotated to a rotational transformed vector (X'(n+2, m), Y'(n+2, m)).

Then, at the point of time when the (n+2)th trigger fs has been input, the converted Y-axis component Y'(n+2, m) is outside of the dead zone ±α (Y'(n+2, m)>+α) as shown in FIG. 10. Therefore, the rotation-angle detecting unit 6 performs a rotational operation.

When the (n+2)th trigger fs has been input, as described above, the converted Y-axis component Y'(n+2, m) deviates from the dead zone ±α (Y'(n+2, m)>+α) as shown in FIG. 10; therefore, the rotation-angle detecting unit 6 performs a rotational operation. Through this rotational operation, the rotational transformed vector (X'(n+2), m), Y'(n+2, m)) is rotated to a rotational transformed vector (X'(n+2), m+1), Y'(n+2, m+1)) as shown in FIG. 11.

At this time, the converted Y-axis component Y'(n+2, m+1) of the rotational transformed vector (X'(n+2), m+1), Y'(n+2, m+1)) is within the dead zone (−α<Y', (n+2, m+1)<+α), so the rotation-angle detecting unit 6 does not perform a rotational operation.

Furthermore, at this time, the rotation-angle detecting device 1 sets the width of the dead zone (the dead zone width) α to be equal to or greater than an amount of change of the rotor vector component Y when rotated by the unit rotation angle θstep near the X-axis, thereby the vector can be prevented from chattering near the X-axis.

It is appropriate to set the dead zone width α in this case on the basis of the following equation (5).

$$\alpha > A * \sin\left(\frac{\theta step}{2}\right) \quad (5)$$

As is obvious from the above explanation, the vector generating unit 4, the vector-rotation calculating unit 5, and the rotation-angle detecting unit 6 serve as an angle detecting unit.

Then, the two-phase pulse generating unit 7 generates two-phase pulses ENCA and ENCB on the basis of the detected angle θd. Two-phase pulses ENCA and ENCB with a shift of a quarter of a cycle can be generated at either one of the two resolutions set according to a resolution switching signal precise as shown in FIGS. 7A and 7B. For example, in a case of a resolution switching signal precise=0 (a high resolution), as shown in FIG. 12, two-phase pulses ENCA and ENCB having a 90-degree phase difference are generated on the basis of a detected angle θd[1:0]. Furthermore, in a case of a resolution switching signal precise=1 (a low resolution), as shown in FIG. 12, two-phase pulses ENCA and ENCB having a 90-degree phase difference are generated on the basis of a detected angle θd[2:1].

That is, with the bit width (word length) of the detected angle θd as the maximum resolution, in order to reduce the resolution, the position of bits (2 bits) to be referenced out of the bit width of the detected angle θd is shifted to the left from the lower bit. By the left shift, the position of the least significant bit of the detected angle θd is shifted; therefore, the resolution can be reduced. Then, two-phase pulses ENCA and ENCB are generated on the basis of the reference bits shifted to the left.

According to the present embodiment, in the rotation-angle detecting device 1, a resolution at a detected angle θd output from the rotation-angle detecting unit 6 can be set to be changed by a resolution switching signal precise, and the two-phase pulse generating unit 7 generates two-phase pulses ENCA and ENCB on the basis of the set resolution. In this way, two-phase pulses according to the resolution of the detected angle θd can be generated. Therefore, it is possible to support multiple types of resolutions, so that it is possible to detect a rotation angle of the rotor 11 at any of easily-switchable different resolutions.

Furthermore, one type of rotation-angle detecting device 1 can support multiple resolutions; therefore, it is possible to reduce costs of an image processing apparatus or the like.

Moreover, the rotation-angle detecting device 1 is configured to receive a resolution switching signal precise input from the outside; therefore, even after the productization, switching can be performed programmably, and the resolution can be easily switched.

Furthermore, the rotation-angle detecting device 1 according to the present embodiment includes the multiple magnetic sensors (rotation detecting unit) 2u and 2v placed so as to output multiple detection signals which vary sinusoidally according to a rotation angle of the rotor (rotating body) 11 and differ in phase. The rotation-angle detecting device 1 further includes the vector generating unit 4 that generates a rotor vector (a detection vector) composed of an X-axis signal and a Y-axis signal which have a 90-degree phase difference on the basis of the multiple detection signals. The rotation-angle detecting device 1 further includes the sinusoidal-wave generating unit 26 that stores therein sinusoidal wave data (reference sinusoidal wave data) in increments of a predetermined unit angle (reference unit angle) θstep. The rotation-angle detecting device 1 further includes the vector-rotation calculating unit (rotation-vector generating unit) 5 that rotates the rotor vector in increments of the unit angle as a processing unit angle on the basis of the sinusoidal wave data according to the processing unit angle and the rotor vector, thereby generating a rotational transformed vector (a rotated vector). The rotation-angle detecting device 1 further includes the comparators (determining unit) 31 and 32 that determine whether the rotational transformed vector is located within a predetermined dead zone ±α. The rotation-angle detecting device 1 further includes the rotation-angle detecting unit (angle search unit) 6 that rotates the rotational transformed vector in a direction to cause the rotational transformed vector to be located within the dead zone on the basis of results of the determination by comparators 31 and 32, and detects an angle between the rotor vector and the rotational transformed vector as a rotation angle (a detected angle θd) of the rotor 11. In this way, without installing an encoder in the DC brushless motor 10, by using output signals from the existing magnetic sensors 2u, 2v, and 2w, a rotation angle of the rotor 11, which is a rotating shaft of the DC brushless motor 10, can be detected. Then, two-phase pulse signals with a quarter-cycle phase difference for driving the DC brushless motor 10 to rotate can be generated.

Furthermore, the rotation-angle detecting device 1 is applied as a rotation-angle detecting unit to an image processing apparatus that causes the rotation-angle detecting unit to detect a rotation angle of the rotor (rotating body) 11, and controls the rotation of the rotor 11 and performs image processing by driving a drive mechanism using the rotation of the rotor 11. Therefore, a rotation angle of a rotation mechanism when an image processing operation, such as an image forming operation or an image reading operation, is performed using the rotation of the rotor 11 of the DC brushless motor 10 can be detected at any of easily-switchable different resolutions and at low cost.

Moreover, in the rotation-angle detecting device 1, the vector-rotation calculating unit 5 generates the rotated vector by performing a product-sum operation of the detection vector and the reference sinusoidal wave data sindat. Therefore, a rotated vector can be generated by simple arithmetic processing, and a rotation angle of the rotor 11 can be detected at any of easily-switchable different resolutions and at lower cost without increasing the configuration.

Furthermore, in the rotation-angle detecting device 1, the vector-rotation calculating unit 5 includes the resistance-ladder multiplying DACs 21a to 21d, and the adder-subtractor unit 23 and the variable-gain adder-subtractor unit 24 as summing and subtracting amplifiers, and performs a product-sum operation. Therefore, a rotated vector can be generated by high-precision trigonometric multiplication with an inexpensive and simple configuration, and therefore it is possible to detect a rotation angle of the rotor 11 at a different resolution and at lower cost in a more compact manner.

Moreover, the rotation-angle detecting device 1 further includes a dead-zone setting unit that sets a range of dead zone by specifying an upper limit +α and lower limit −α of the dead zone. Therefore, even if the resolution is changed, the rotation-angle detecting device 1 can perform the angle detection while preventing chattering by adjusting the range of dead zone.

Incidentally, in the above-described embodiment, the two-phase pulse generating unit 7 has a function of the resolution setting unit; however, a resolution setting unit 8 can be provided in front of the two-phase pulse generating unit 7 as shown in FIG. 13. A detected angle θd and a resolution switching signal precise are input to the resolution setting unit 8 shown in FIG. 13. Then, the resolution setting unit 8 changes the bit width of the detected angle θd on the basis of the resolution switching signal precise.

For example, in a case of an 8-bit resolution, the resolution setting unit 8 outputs the detected angle θd directly; on the other hand, in a case of a 7-bit resolution, the resolution setting unit 8 outputs a value obtained by halving (right shift) the detected angle θd. Then, the two-phase pulse generating unit 7 generates two-phase pulses ENCA and ENCB from the detected angle θd'[1:0] of the set resolution, for example, in accordance with the logic shown in FIG. 7A. That is, substantially the same processing as the left shift of the position of bits (2 bits) to be referenced out of the bit width of the detected angle θd from a lower bit is performed at a stage prior to the two-phase pulse generating unit 7.

Incidentally, in the above-described embodiment, the two-phase pulse generating unit 7, which generates two-phase pulse signals with a shift of a quarter of a cycle is provided as an output unit; however, the output unit can be configured to output any of signals shown in FIGS. 14 to 16.

First, an example shown in FIG. 14 is explained. In FIG. 14, on the basis of the detected angle θd, a pulse signal (Pulse A) indicating a positive direction is output if the detected angle is increased, or a pulse signal (Pulse B) indicating a negative direction is output if the detected angle is decreased. That is, the rotation angle detected by the angle detecting unit is converted into two-phase pulse signals each representing either the positive direction or the negative direction, and the two-phase pulse signals are output. FIG. 14 shows a waveform in a case of, for example, an 8-bit resolution (a high resolution). In a case of a 7-bit resolution (a low resolution), the same logic as that shown in FIGS. 7A and 7B is applied to the Pulse A and the Pulse B, thereby a pulse signal with twice the cycle shown in FIG. 14 is generated.

By outputting the signal shown in FIG. 14, compatibility is achieved when the signal receiving side is constructed to receive the two-phase pulse signals each representing the positive direction or the negative direction.

Next, an example shown in FIGS. 15A and 15B is explained. In FIGS. 15A and 15B, on the basis of the detected angle θd, a pulse signal indicating an amount of change in the detected angle and a rotation-direction indicating signal (DIR) indicating a rotation direction are output. In the example shown in FIGS. 15A and 15B, the DIR is set to Hi level when the rotation direction is the positive direction; on the other hand, the DIR is set to Lo level when the rotation direction is the negative direction. That is, the rotation angle detected by the angle detecting unit is converted into a one-phase pulse signal and a direction indicating signal indicating a rotation direction of the rotor, and the one-phase pulse signal and the direction indicating signal are output. FIGS. 15A and 15B show waveforms in a case of, for example, an 8-bit resolution (a high resolution). In a case of a 7-bit resolution (a low resolution), the same logic as that shown in FIGS. 7A and 7B is applied to the pulse, thereby a pulse signal with twice the cycle shown in FIGS. 15A and 15B is generated.

By outputting the signal shown in FIGS. 15A and 15B, compatibility is achieved when the signal receiving side is constructed to receive the pulse signal indicating an amount of change in the detected angle and the rotation-direction indicating signal indicating a rotation direction.

Next, an example shown in FIG. 16 is explained. In FIG. 16, the detected angle θd is converted into serial data, and the serial data is output. As an example of the serial data, the serial data is composed of one start bit, eight data bits, one parity bit, and one stop bit as shown in FIG. 16, and the converted data includes the data that is converted to the eight data bits. That is, the rotation angle detected by the angle detecting unit is converted into a serial signal, and the serial signal is output. In FIG. 16, in a case of an 8-bit resolution (a high resolution), for example, θd is directly included in the data bits. In a case of a 7-bit resolution (a low resolution), the detected angle θd[7:1] is included in the lower seven bits, and "0" is set in the most significant bit.

By outputting the signal shown in FIG. 16, compatibility is achieved when the signal receiving side is constructed to receive the serial signal.

Incidentally, in the present embodiment, a rotation angle of the rotor 11 is detected by calculating a vector and rotating the calculated vector in an angle detecting unit; however, it is not limited thereto. For example, a rotation angle can be found from values of X and Y components of a vector as arctan(Y/X)=θ. Furthermore, besides the method using a vector, any other methods can be used as long as a detected angle θd can be found from output signals from the magnetic sensors 2u and 2v (or single-ended signals), and it is possible to allow change of the resolution through the two-phase pulse generating unit 7.

Second Embodiment

Figure 17:
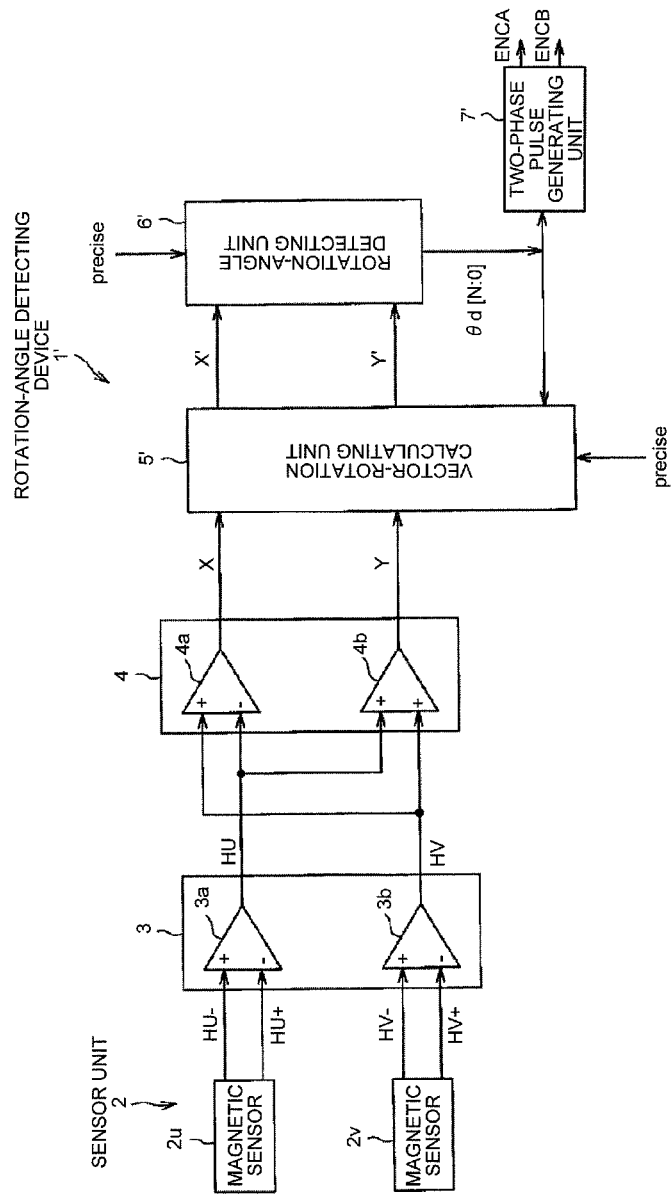
FIG. 17 is a block configuration diagram of a rotation-angle detecting device according to a second embodiment of the present invention.
Figure 18:
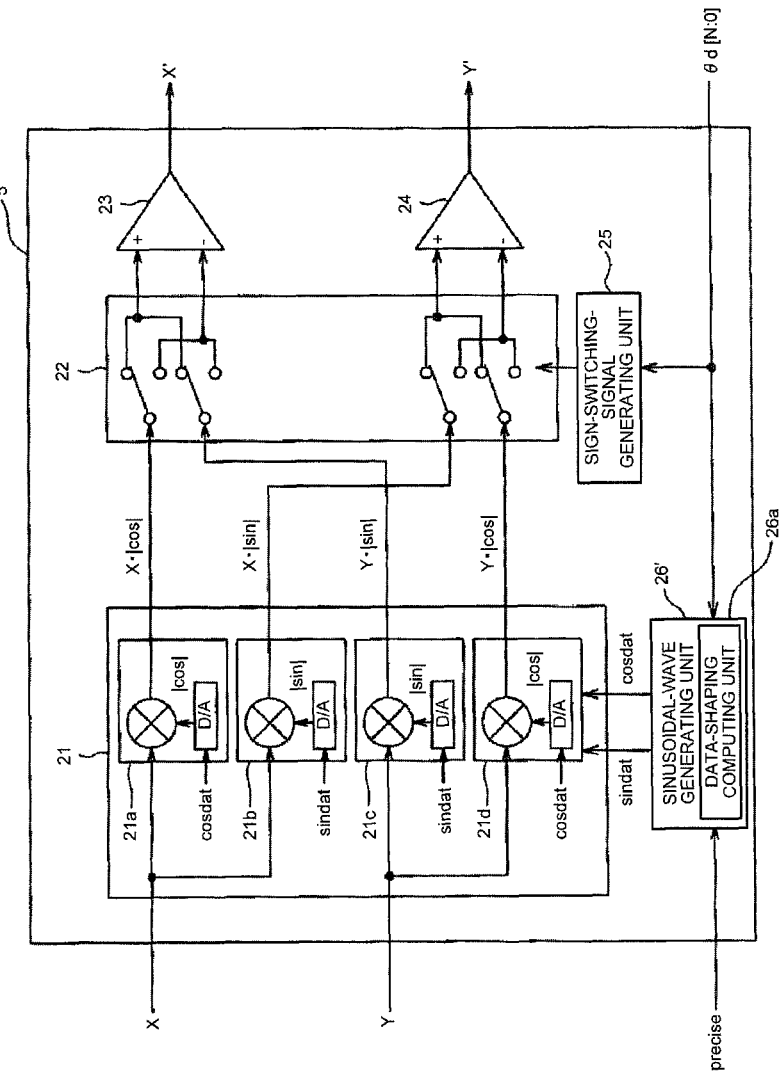
FIG. 18 is a circuit configuration diagram of a vector-rotation calculating unit shown in FIG. 17.
Figure 19:
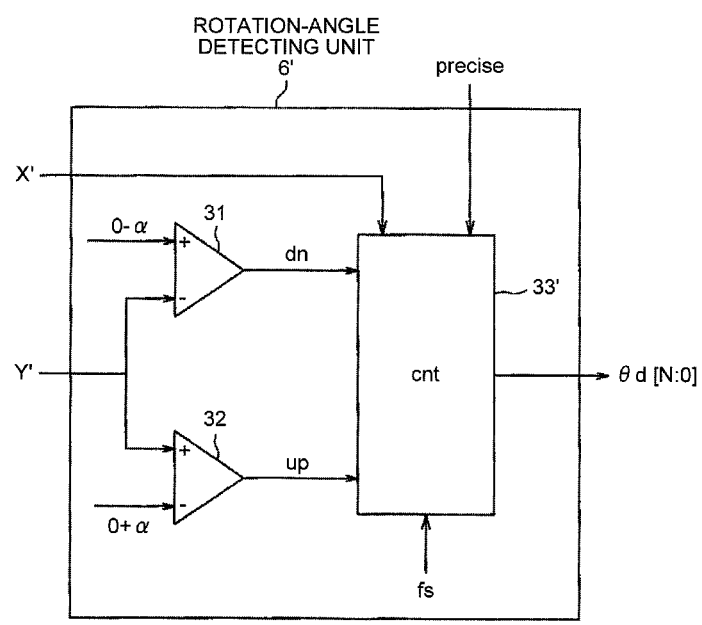
FIG. 19 is a circuit configuration diagram of a rotation-angle detecting unit shown in FIG. 17.
Figure 20:
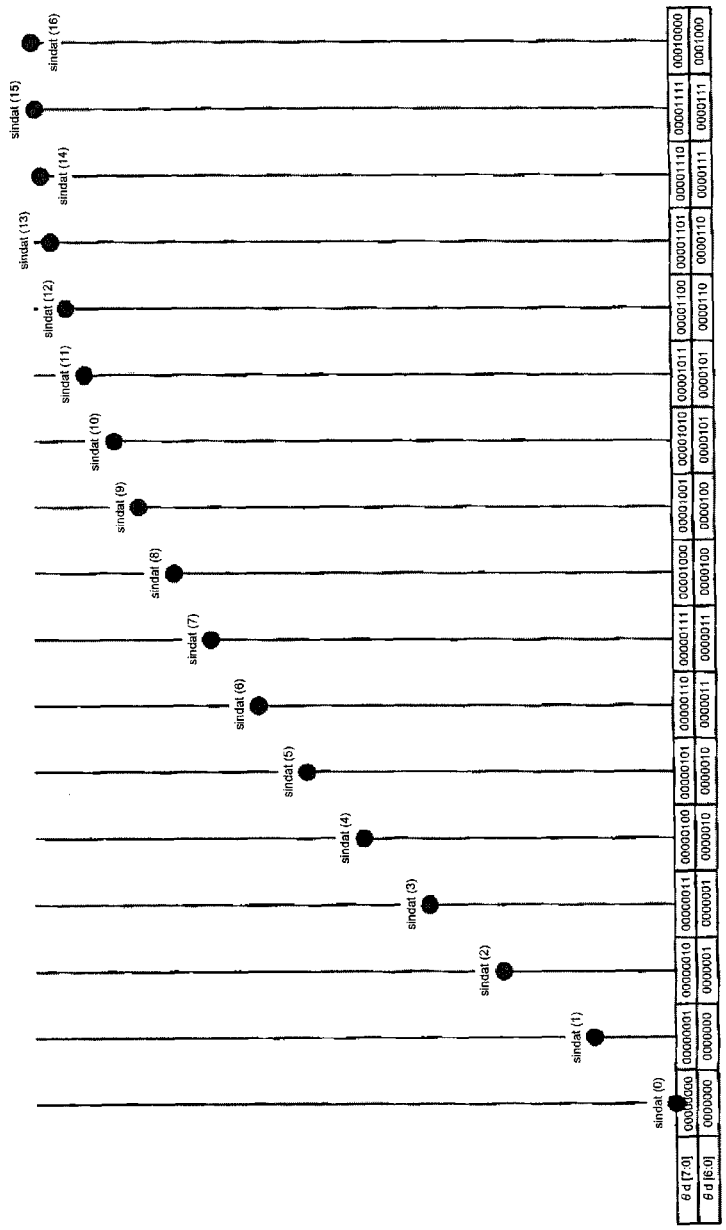
FIG. 20 is an explanatory diagram of a resolution changing process and a conversion process for converting a rotor vector component into a converted axis component.
Figure 21:
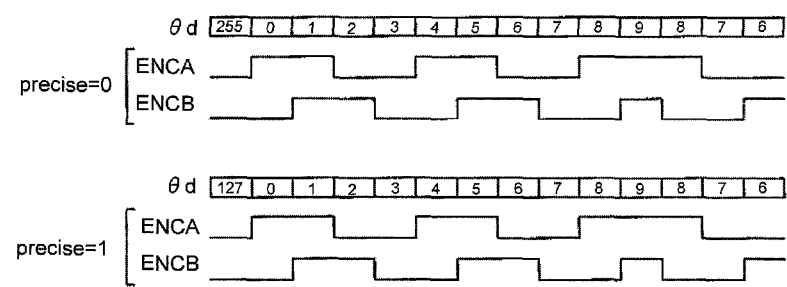
FIG. 21 is a waveform diagram showing an example of waveforms of two-phase pulse signals output from the rotation-angle detecting device shown in FIG. 17.

Subsequently, a second embodiment of the present invention is explained below with reference to FIGS. 17 to 21. Incidentally, the same component as in the first embodiment is denoted by the same reference numeral, and description of the component is omitted. FIG. 17 is a block configuration diagram of a rotation-angle detecting device according to the second embodiment of the present invention. FIG. 18 is a circuit configuration diagram of a vector-rotation calculating unit shown in FIG. 17. FIG. 19 is a circuit configuration diagram of a rotation-angle detecting unit shown in FIG. 17. FIG. 20 is an explanatory diagram of a resolution changing process and a conversion process for converting a rotor vector component into a converted axis component. FIG. 21 is a waveform diagram showing an example of the waveforms of two-phase pulse signals output from the rotation-angle detecting device shown in FIG. 17.

In the present embodiment, the resolution is switched by not the two-phase pulse generating unit 7 but the vector-rotation calculating unit 5 and the rotation-angle detecting unit 6. A rotation-angle detecting device 1' according to the present embodiment is shown in FIG. 17. In FIG. 17, units other than a vector-rotation calculating unit 5', a rotation-angle detecting unit 6', and a two-phase pulse generating unit 7' have the same configuration as those shown in FIG. 1.

A configuration of the vector-rotation calculating unit 5' is shown in FIG. 18. In FIG. 18, except for a sinusoidal-wave generating unit 26', the vector-rotation calculating unit 5' has the same configuration as that shown in FIG. 5. The sinusoidal-wave generating unit 26' can switch the resolution of sinusoidal wave data sindat and cosine wave data cosdat to be output to the multiplying unit 21 on the basis of a resolution switching signal precise. Incidentally, also in the present embodiment, in the same manner as in the first embodiment, the resolution is switched between two types of resolutions: an 8-bit resolution (a high resolution) and a 7-bit resolution (a low resolution).

In a non-volatile memory such as a ROM included in the sinusoidal-wave generating unit 26', sinusoidal wave data sindat in increments of a reference unit angle θstep=2π/(2^8) has been stored in advance. That is, the sinusoidal-wave generating unit 26' serves as a sinusoidal-wave-data storage unit. The detection resolution at the reference unit angle is 8 as in the first embodiment. The sinusoidal-wave generating unit 26' retrieves sinusoidal wave data sindat (reference sinusoidal wave data) stored in the non-volatile memory on the basis of an input detected angle θd. Then, the sinusoidal-wave generating unit 26' outputs the retrieved data as sinusoidal wave data sindat and cosine wave data cosdat to the multiplying unit 21.

The sinusoidal-wave generating unit 26' further includes a data-shaping computing unit 26a. The data-shaping computing unit 26a switches whether or not to perform data shaping of the input detected angle θd on the basis of a resolution switching signal precise; when the data shaping is performed, the detected angle θd is shaped as described below.

A configuration of the rotation-angle detecting unit 6' is shown in FIG. 19. In FIG. 19, except for a repeat counter 33', the rotation-angle detecting unit 6' has the same configuration as that shown in FIG. 6. The repeat counter 33' can change the count width between 8 bits and 7 bits according to the resolution on the basis of a resolution switching signal precise. Therefore, the detected angle θd is output at 8 bits ([7:0]) or 7 bits ([6:0]) according to the set resolution.

The function of switching the resolution of two-phase pulses ENCA and ENCB on the basis of a resolution switching signal precise described in the first embodiment is deleted in the two-phase pulse generating unit 7'.

Subsequently, the action of the present embodiment is explained. Incidentally, in the following explanation, respective operations at the above-described two switchable resolutions are explained.

First, when the resolution is 8 bits (a high resolution), the repeat counter 33' serves as an 8-bit counter, and the detected angle θd is output as 8-bit data. Then, in the sinusoidal-wave generating unit 26', the data-shaping computing unit 26a does not perform a data shaping process, and the sinusoidal-wave generating unit 26' retrieves sinusoidal wave data sindat (reference sinusoidal wave data) from the non-volatile memory by referring to the input 8-bit detected angle θd and outputs the retrieved data as sinusoidal wave data sindat and cosine wave data cosdat to the multiplying unit 21. For example, as shown in FIG. 20, sin(1) is output when the detected angle θd=00000001, and sin(8) is output when the detected angle θd=00001000. Incidentally, FIG. 20 is a diagram showing an example of correspondence between θd and sinusoidal wave data sindat. As is obvious from the above explanation, when the resolution is 8 bits, the same operation as in the first embodiment is performed.

Then, when the resolution is 7 bits (a low resolution), the repeat counter 33' serves as a 7-bit counter, and the detected angle θd is output as 7-bit data. Then, in the sinusoidal-wave generating unit 26', the data-shaping computing unit 26a performs a data shaping process. The data-shaping computing unit 26a performs a process of adding data "0" at a lower bit so that the data word length is 8 bits. For example, as shown in FIG. 20, when a detected angle θd[6:0]=0000001 is input, the detected angle θd is converted into a detected angle θd[7:0]=00000010 after the data shaping operation. That is, in the case of a low resolution, the detected angle θd[7:0] changes in order of 00000000, 00000010, and 00000100.

Then, the sinusoidal-wave generating unit 26' retrieves sinusoidal wave data sindat (reference sinusoidal wave data) from the non-volatile memory by referring to the detected angle θd subjected to the data shaping process, and outputs the retrieved data as sinusoidal wave data sindat and cosine wave data cosdat to the multiplying unit 21. For example, when the detected angle θd input from the repeat counter 33' is θd=0000001, the data-shaping computing unit 26a performs the data shaping process on the detected angle θd, and the sinusoidal-wave generating unit 26' outputs sin(2). When the detected angle θd=0000100, likewise, the data-shaping computing unit 26a performs the data shaping process on the detected angle θd, and the sinusoidal-wave generating unit 26' outputs sin(8).

That is, the count width of the repeat counter 33' is changed to a smaller width, thereby reducing the bit width of the detected angle θd, and the detected angle θd is shifted to the left, and "0" is added at the least significant bit, thereby changing the resolution of the sinusoidal wave data sindat. That is, the data-shaping computing unit 26a and the repeat counter 33' serve as a resolution setting unit that allows change of the resolution of a rotation angle (a detected angle θd). Furthermore, the sinusoidal-wave generating unit 26' serves as a sinusoidal-wave-data output unit that retrieves sinusoidal wave data from the sinusoidal-wave-data storage unit on the basis of the rotation angle at the resolution changed by the resolution setting unit and outputs the retrieved data to the angle detecting unit.

Then, the sinusoidal wave data sindat and cosine wave data cosdat output from the sinusoidal-wave generating unit 26' are multiplied by rotor vector components X and Y by the multiplying unit 21 in the same manner as in the first embodiment. That is, the angle detecting unit detects a rotation angle on the basis of a sinusoidal wave signal and sinusoidal wave data.

By the above-described operation, the resolution of two-phase pulses ENCA and ENCB can be changed according to a resolution switching signal precise as shown in FIG. 21.

According to the present embodiment, in the rotation-angle detecting device 1, the rotation-angle detecting unit 6 is configured to be able to change the count width of the repeat counter 33' for generating an output detected angle $\theta d$, and the sinusoidal-wave generating unit 26' includes the data-shaping computing unit 26a. Then, the count width of the repeat counter 33' can be changed by a resolution switching signal precise, and, when a low resolution is set by the resolution switching signal precise, the data-shaping computing unit 26a adds "0" at a lower bit. In this way, it is possible to support multiple types of resolutions by the setting using a resolution switching signal precise, and therefore it is possible to detect a rotation angle of the rotor 11 at any of easily-switchable different resolutions.

Furthermore, the sinusoidal-wave generating unit 26' includes the data-shaping computing unit 26a, so it is not necessary to store data for each resolution in the non-volatile memory of the sinusoidal-wave generating unit 26'. That is, it is only necessary to store data for the maximum resolution only.

Incidentally, in the above first and second embodiments, two types of resolutions are set; needless to say, three or more types of resolutions may be set. That is, change to the further lower resolution may be allowed. Furthermore, in the second embodiment, one bit of the detected angle $\theta d$ is changed; however, the number of bits to be changed may be any number, such as two bits.

Moreover, the first embodiment and the second embodiment can be combined. For example, the cycles of two-phase pulses ENCA and ENCB is doubled, and the count width of the repeat counter 33' is reduced by one bit, so that a substantially quarter of the resolution can be achieved.

Furthermore, in the above embodiments, there are described the hardware configurations shown in FIGS. 1, 13, 17 and so on; however, a CPU of a computer can serve as the vector generating unit 4, the vector-rotation calculating unit 5, the rotation-angle detecting unit 6, and the two-phase pulse generating unit 7. That is, the vector generating unit 4, the vector-rotation calculating unit 5, the rotation-angle detecting unit 6, and the two-phase pulse generating unit 7 can be configured as a computer program causing a computer to implement a rotation-angle detecting method including an angle detecting step and a resolution setting step.

Last, provide an example of a motor drive unit and image processing apparatus including any of the rotation-angle detecting devices 1 and 1' according to the foregoing two embodiments.

Figure 22:
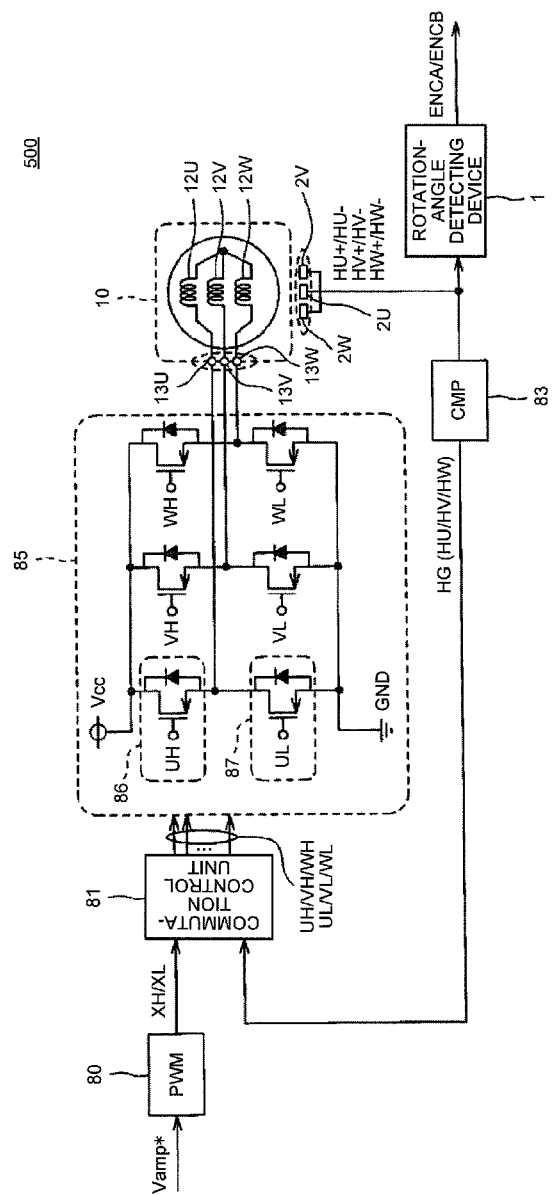
FIG. 22 is an entire configuration diagram of a motor drive unit including the rotation-angle detecting device shown in FIG. 17.

FIG. 22 shows a motor drive unit 500 including the rotation-angle detecting device 1. The rotation-angle detecting device 1 is the rotation-angle detecting device 1 described in the first or second embodiment, and outputs two-phase pulses ENCA and ENCB in response to a change in the rotation angle of the rotor 11. Incidentally, the rotation-angle detecting device 1 in FIG. 22 does not output a detected angle $\theta d$; however, a detected angle $\theta d$ may be configured to be output and the detected angle $\theta d$ may be used for position control and sinusoidal wave driving, and/or the like.

Figures 23, 24:
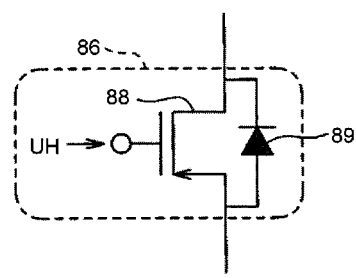
FIG. 23 is a diagram showing conditions for generating Hall signals.
FIG. 24 is a configuration diagram of an upper arm of a drive commutation circuit shown in FIG. 22.

A Hall comparator 83 connected to the DC brushless motor 10 and the rotation-angle detecting device 1 is a comparator that binarizes differential signals HU+/HU−, HV+/HV−, and HW+/HW− output from the magnetic sensors 2u, 2v, and 2w in accordance with logic shown in FIG. 23, and outputs the binarized signals as Hall signals HG(HU, HV, HW). In FIG. 23, for example, HG(HU) at the top column outputs a high-level signal if HU+ is equal to or more than HU−, and outputs a low-level signal if HU+ is less than HU−. The same holds true for HG(HV) and HG(HW).

A drive commutation circuit 85 is, as shown in FIGS. 22 and 24, configured such that an upper arms 86 in each of which a switching element 88 connected to a power supply Vcc and a diode 89 are connected in parallel and lower arms 87 each of which has the some configuration as the upper arm 86 and is connected to ground GND for three phases are connected. Respective switching elements are driven by gate signals (UH, VH, WH, UL, VL, WL), and pulse-width modulated voltages are applied to coils 12U, 12V, and 12W of the DC brushless motor 10, thereby supplying drive currents to the coils 12U, 12V, and 12W and driving the DC brushless motor 10 to rotate.

A modulating unit 80 performs pulse-width modulation (hereinafter, referred to as "PWM") of a drive-voltage command value Vamp*, thereby generating PWM phase gate signals XH and XL on the basis of predetermined logic.

The operation of the modulating unit 80 is explained below with FIG. 25.

Figure 25:
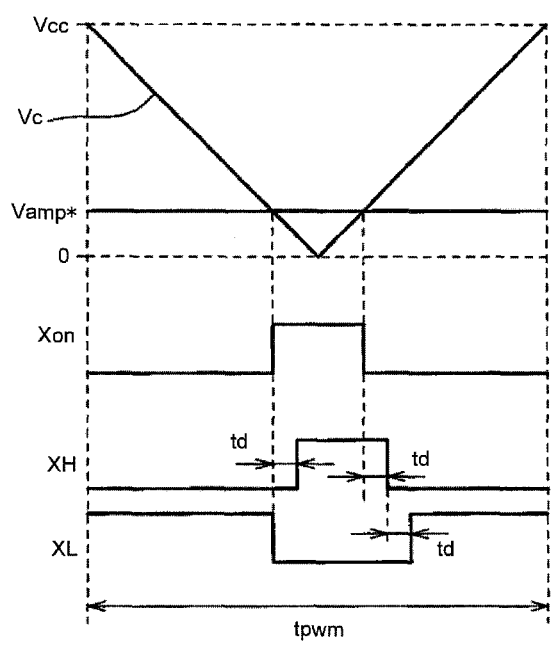
FIG. 25 is a diagram showing operation of a modulating unit shown in FIG. 22.

A carrier wave Vc shown in the first stage in FIG. 25 is a triangle wave with a predetermined PWM period, and has amplitude from the ground GND to the power-supply voltage Vcc. The modulating unit 80 compares the magnitude of the non-negative drive-voltage command value Vamp* and the carrier wave Vc, and generates a PWM signal Xon shown in the second stage.

Then, as shown in the third and fourth stages in FIG. 25, the modulating unit 80 generates a PWM phase gate signal XH for the upper-arm switching element 88, which is a signal delayed by td from the PWM signal Xon. Furthermore, the modulating unit 80 generates a PWM phase gate signal XL for the lower-arm switching element, which is a signal obtained by inverting the PWM signal Xon and delaying the rising edge (the trailing edge in Xon) by twice the td. Incidentally, td denotes a short prevention interval (dead time) provided to prevent a short circuit of the upper and lower-arm switching elements, and tpwm denotes the length of the PWM period (a period of the carrier wave Vc).

Subsequently, a configuration and operation of a commutation control unit 81 are explained.

When having received the PWM phase gate signals XH and XL, the commutation control unit 81 select respective gate signals appropriate to the U, V, and W-phases on the basis of High/Low logic of the Hall signals HG(HU, HV, HW), and outputs the selected gate signals.

Figure 26:
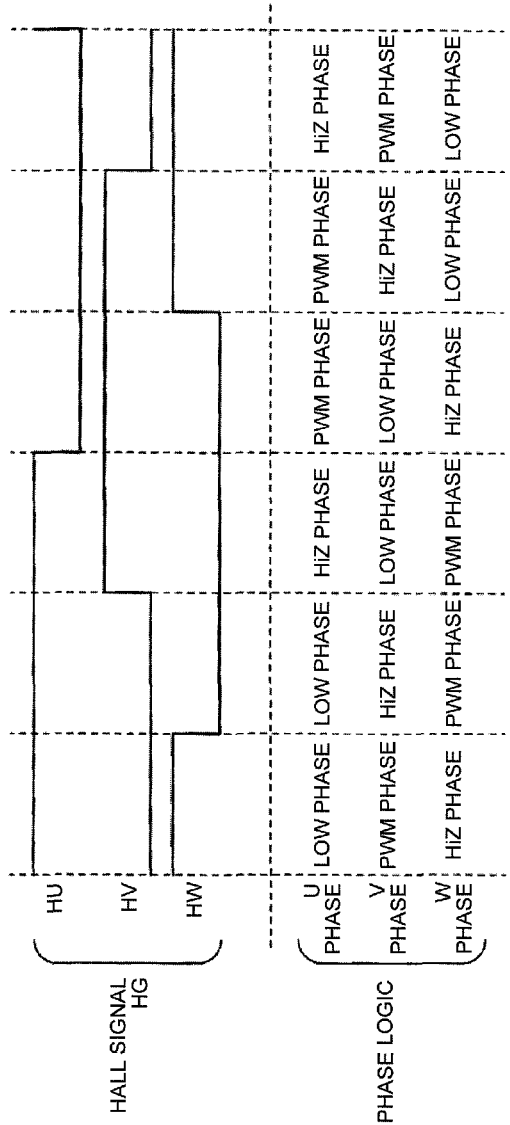
FIG. 26 is a diagram showing Hall signals and phase logic of rectangular wave driving.

First, to drive the motor to rotate with square wave driving, the commutation control unit 81 allocates any of phase states: PWM phase, LOW phase, and HiZ phase to the U, V, and W-phases in accordance with respective states of the Hall signals HG as shown in FIG. 26. Then, with respect to each phase state, a gate signal described below is output.

That is, as shown in FIG. 27, in a case of PWM phase, the commutation control unit 81 selects XH as an upper-arm gate signal YH, and selects XL as a lower-arm gate signal YL. In a case of LOW phase, the upper-arm gate signal YH is set to always Lo (low), and the lower-arm gate signal YL is set to always Hi (high). In a case of HiZ phase, the upper-arm gate signal YH and the lower-arm gate signal YL are both set to always Lo (low). Incidentally, the switching elements included in the drive commutation circuit 85 are conducted if an applied gate signal is Hi, and are blocked if an applied gate signal is Lo. The gate signals YH and YL means gate signals UH and UL in the case of the U-phase, gate signals VH and VL in the case of the V-phase, and gate signals WH and WL in the case of the W-phase (see FIG. 22).

These selections in the three phases are updated all together at the beginning of the PWM period. When the rotation direction is reversed, it is only necessary to interchange the PWM and LOW phases shown in FIG. 26. An example of the commutation operation of the commutation control unit 81 is explained below.

For example, in FIG. 26, phase logic of the first PWM period is that the U-phase is LOW phase, the V-phase is PWM phase, and the W-phase is HiZ phase. In this case, in accordance with a relationship shown in FIG. 27, in the U-phase, the switching element 88 of the upper arm 86 is blocked, and the switching element of the lower arm 87 is conducted. In the V-phase, in accordance with XH and XL in FIG. 25, the switching element 88 of the upper arm 86 is conducted for a predetermined period of time, and the switching element of the lower arm 87 is blocked for a certain period of time including the predetermined conduction period of the upper arm. In the W-phase, the switching elements of the both upper and lower arms 86 and 87 are blocked. As a result, in this case, during the predetermined conduction period, a drive current flows from the V-phase coil 12V to the U-phase coil 12U through the switching elements of the V-phase upper arm 86 and the U-phase lower arm 87. As a result, a rotating drive force is caused by a relationship between the drive current flowing through the coils 12V and 12U and the magnetic field of the permanent magnet of the rotor 11 shown in FIG. 1, and the rotor 11 is driven.

In FIG. 26, phase logic of the next (second) PWM period is that the U-phase is LOW phase, the V-phase is HiZ phase, and the W-phase is PWM phase. In this case, by the commutation operation similar to that described above, during the predetermined conduction period of the W-phase upper arm 86, a drive current flows from the W-phase coil 12W to the U-phase coil 12U through the switching elements of the W-phase upper arm 86 and the U-phase lower arm 87. As a result, a rotating drive force is caused by a relationship between the drive current flowing through the coils 12W and 12U and the magnetic field of the permanent magnet of the rotor 11 shown in FIG. 2, and the rotor 11 is driven.

In FIG. 26, phase logic of the further next (third) PWM period is that the U-phase is HiZ phase, the V-phase is LOW phase, and the W-phase is PWM phase. In this case, by the commutation operation similar to that described above, during the predetermined conduction period of the W-phase upper arm 86, a drive current flows from the W-phase coil 12W to the V-phase coil 12V through the switching elements of the W-phase upper arm 86 and the V-phase lower arm 87. As a result, a rotating drive force is caused by a relationship between the drive current flowing through the coils 12W and 12V and the magnetic field of the permanent magnet of the rotor 11 shown in FIG. 1, and the rotor 11 is driven.

Afterward, in the fourth PWM period in FIG. 26, during the predetermined conduction period of the U-phase upper arm, a drive current flows from the U-phase coil 12U to the V-phase coil 12V through the switching elements of the U-phase upper arm 86 and the V-phase lower arm 87. In the fifth PWM period, during the predetermined conduction period of the U-phase upper arm, a drive current flows from the U-phase coil 12U to the W-phase coil 12W through the switching elements of the U-phase upper arm 86 and the W-phase lower arm 87. In the sixth PWM period, during the predetermined conduction period of the V-phase upper arm, a drive current flows from the V-phase coil 12V to the W-phase coil 12W through the switching elements of the V-phase upper arm 86 and the W-phase lower arm 87. From this point forward, a pattern of the series of above-described PWM periods (six periods) shown in FIG. 26 is repeated, and the rotor 11 is continuously driven to rotate by drive current caused to flow through the coils 12U, 12V, and 12V appropriately by the commutation operation of the drive commutation circuit 85. That is, periodically-varying drive voltage is applied to coil terminals 13U, 13V, and 13W of the DC brushless motor 10, thereby driving the rotor 11 to rotate.

According to the motor drive unit 500, an angle detecting device 1 is included in the motor drive unit 500 that drives the DC brushless motor 10; therefore, it eliminates the need for addition of a separate sensor such as an optical encoder, and an angle can be detected accurately.

Furthermore, output signals from Hall elements HU, HV, and HW w necessarily provided to commutation-drive the DC brushless motor 10 can be used in the following purposes. That is, the output signals are used not only for detection of the commutation timing by the Hall comparator 83, the commutation control unit 81, the drive commutation circuit 85, and the modulating unit 80 but also for detection of a rotation angle by the rotation-angle detecting device 1. Consequently, the need for addition of a separate sensor such as an optical encoder is eliminated; therefore, the motor drive unit 500, which includes a configuration for angle detection separately from a configuration for detection of the commutation timing, can be configured inexpensively. The "configuration for detection of the commutation timing" here is, for example, a configuration including the Hall comparator 83, the commutation control unit 81, the drive commutation circuit 85, and the modulating unit 80 in the case of FIG. 22, and the "configuration for angle detection" here is, for example, a configuration including the rotation-angle detecting device 1.

Figure 28:
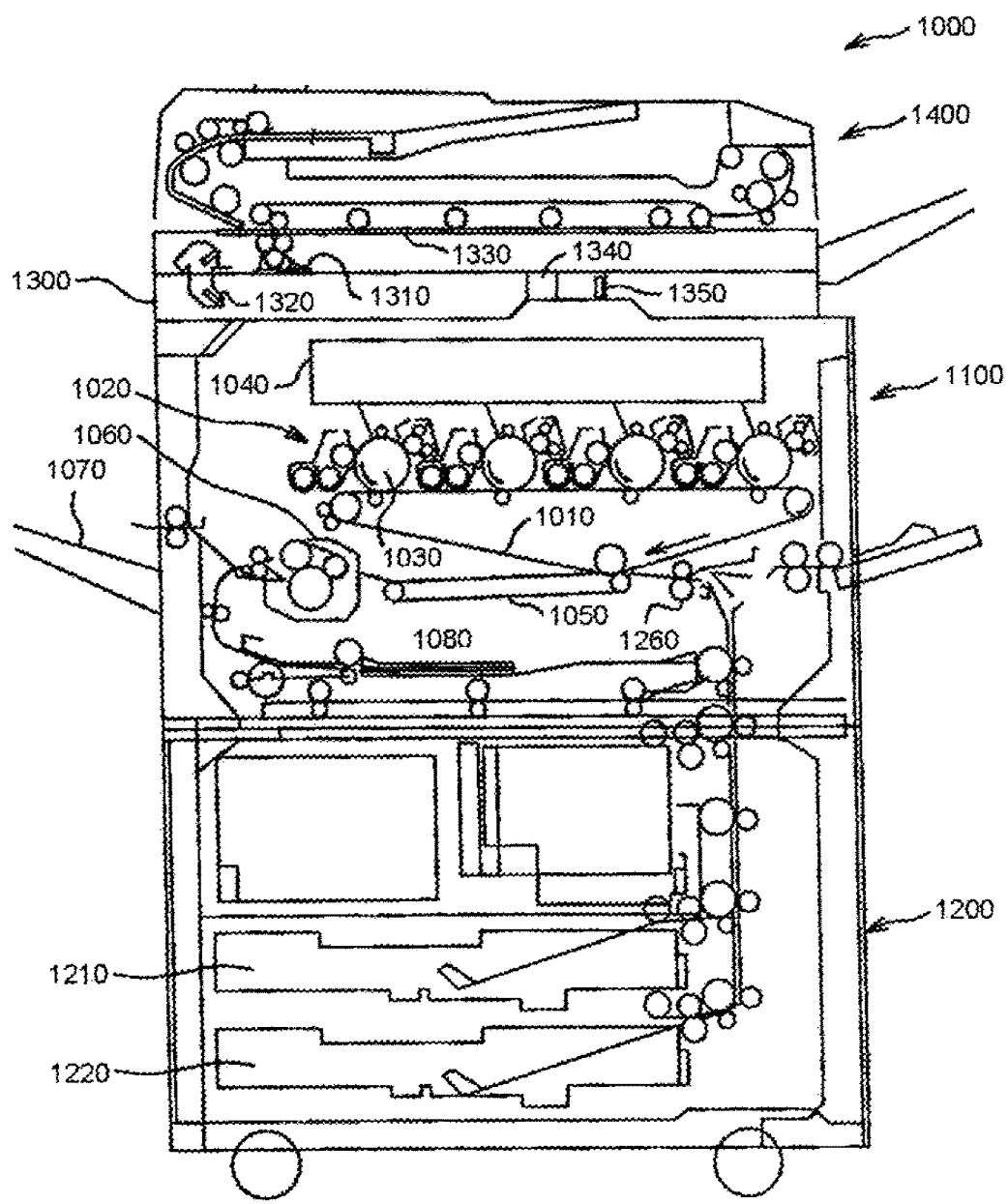
FIG. 28 is a cross-sectional view showing an example of an image processing apparatus shown in FIG. 22.

Subsequently, an example of an image processing apparatus including the motor drive unit 500, i.e., the rotation-angle detecting device 1 is explained. FIG. 28 is a cross-sectional view showing an example of an image processing apparatus 1000; the image processing apparatus 1000 is a so-called tandem type full-color apparatus and constructed as a copying apparatus by including an image reading unit. The copying apparatus in the present example includes an apparatus main body 1100 on a sheet feeding table 1200, and a scanner 1300 is placed on top of the apparatus main body 1100, and an automatic document feeder (ADF) 1400 is installed on top of the scanner 1300.

Inside the scanner 1300, a first travelling body 1310 composed of a light source for illumination and a mirror and a second travelling body 1320 including a mirror are mounted on a platen glass 1330 to be capable of moving parallel to each other. The second travelling body 1320 adopts a known optical system that moves at one-half the speed of the first travelling body 1310, and the first and second travelling bodies 1310 and 1320 scan an image of an original set on the platen glass 1330 by travelling. A reflected light from the original illuminated by the light source is imaged by a condenser lens 1340, and is taken by a solid-state image sensing device 1350 such as a CCD. Data of the image is processed by an image processing unit (not shown) of the apparatus main body 1100.

An intermediate transfer belt 1010 is placed roughly in the center of the apparatus main body 1100. Along the upper side of the intermediate transfer belt 1010, four image forming units 1020 are arranged. In each image forming unit 1020, devices required for an electrophotographic process are arranged around a photosensitive drum 1030.

The intermediate transfer belt 1010 is rotatably supported by multiple support rollers so that the intermediate transfer belt 1010 can rotate in a clockwise direction in FIG. 28. Inside the intermediate transfer belt 1010, transfer rollers provided as primary transfer unit are placed in the positions opposed to the respective photosensitive drums 1030 of the image forming units.

An exposure device 1040 is placed above the image forming units 1020. Writing lights from the exposure device 1040 are emitted to the respective photosensitive drums 1030 of the respective image forming units 1020.

A transfer conveyance belt 1050 is placed below the intermediate transfer belt 1010. One of rollers supporting the transfer conveyance belt 1050 serves as a secondary transfer roller, and secondarily transfers an image on the intermediate transfer belt 1010 onto a recording medium (a transfer sheet or the like).

A fixing device 1060 is placed at the left of the transfer conveyance belt 1050. A discharge tray 1070 is attached to a side surface of the apparatus at the left of the fixing device 1060. A sheet reversing unit 1080 is placed in the lowest part of the apparatus main body 1100. Then, the sheet feeding table 1200 includes two-tier sheet cassettes 1210 and 1220.

When a copy of an original is made by using the full-color copying apparatus shown in FIG. 28, a user sets the original on an original table of the ADF 1400 or the platen glass 1330 of the scanner. Then, when the user has pressed a start switch on an operation panel (not shown), the scanner is driven, and a reflected light from the light source is reflected by the mirror, thereby letting the light into a reading sensor (the solid-state image sensing device 1350) through the condenser lens 1340 to cause the reading sensor to read original information.

Furthermore, when the start switch on the operation panel has been pressed, the intermediate transfer belt 1010 is driven to rotate by a drive motor (not shown). At the same time, the photosensitive drums 1030 of the image forming units 1020 are rotated, and black, yellow, magenta, and cyan monochromatic images are formed on the photosensitive drums 1030, respectively. Then, these monochromatic images are sequentially transferred onto the intermediate transfer belt 1010 in a superimposed manner, and a synthetic color image is formed on the intermediate transfer belt 1010.

As the drive motor (not shown) for driving the intermediate transfer belt 1010 to rotate, the DC brushless motor 10 driven by the motor drive unit 500 shown in FIG. 22 can be applied. Then, as a motor drive unit for driving the DC brushless motor 10 applied as the drive motor, the motor drive unit 500 can be applied. In this case, although not illustrated in FIG. 28, the motor drive unit 500 is included in the image processing apparatus 1000.

Moreover, when the start switch has been pressed, a sheet is fed from the sheet feeding table 1200, and is butted against a registration roller 1260 and stopped temporarily.

Then, the registration roller 1260 is rotated in synchronization with the synthetic color image on the intermediate transfer belt 1010, and the sheet is conveyed in between the intermediate transfer belt 1010 and the transfer conveyance belt 1050, and the image is transferred onto the sheet by a secondary transfer unit, and thereby a color image is recorded on the sheet. After the transfer of the image, the sheet is conveyed into the fixing device 1060, and the toner image is fixed on the sheet, and then the sheet is discharged onto the discharge tray 1070.

According to the image processing apparatus 1000, the DC brushless motor 10 is applied as a drive motor for driving the intermediate transfer belt 1010 and/or the like of the image processing apparatus 1000 to rotate, and the motor drive unit 500 is used as a drive unit of the DC brushless motor 10. Therefore, the need for addition of a separate sensor such as an optical encoder is eliminated, and an angle can be detected accurately. Accordingly, it is possible to drive the drive motor of the image processing apparatus 1000 accurately.

Incidentally, the motor described in the above embodiments is not limited to an outer rotor type, and can be an inner rotor type. Furthermore, the coil connection pattern is not limited to a Y-connection (a star connection), and can be a delta connection. Moreover, the number of poles of the motor rotor is not limited to eight. Furthermore, the arrangement of the Hall elements is not limited to the arrangement of the Hall elements with a 120 degree phase difference.

Moreover, the motor drive unit according to the present invention can be suitably applied to home electric appliances, office automation equipment, and the like; as office automation equipment, the motor drive unit can be applied to not only the above-described image forming apparatus but also an image reading device and the like.

Furthermore, in the image processing apparatus, the configuration of the image forming units is arbitrary, and the order of the image forming units arranged in tandem is arbitrary. Moreover, the image processing apparatus is not limited to a tandem type; an image processing apparatus in which multiple developing units are arranged around one photoreceptor and an image processing apparatus using a revolver type developing unit can be adopted. Furthermore, the present invention can be also applied to a full-color image processing apparatus using three color toners, a multicolor image processing apparatus using two color toners, and a black-and-white image processing apparatus. Needless to say, the image processing apparatus is not limited to a copying apparatus, and may be a printer, a facsimile machine, and a multifunction peripheral having multiple functions.

Moreover, the present invention is not limited to the above embodiments. That is, based on conventional public knowledge, various modifications can be made by those skilled in the art without departing from the scope of the present invention. As long as modified apparatuses have the configurations of the rotation-angle detecting device and the image processing apparatus according to the present invention, the modified apparatuses obviously fall under the category of the present invention.

According to an embodiment, a rotation-angle detecting device includes a resolution setting unit allows change of a resolution of a detected rotation angle; therefore, it is possible to support multiple types of resolutions, and it is possible to detect a rotation angle of a rotating body at any of easily-switchable different resolutions.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A rotation-angle detecting device comprising:
    an angle detecting unit that detects a rotation angle of a rotating body based on sinusoidal wave signals output from multiple sensors arranged to have a phase difference, according to the rotation angle of the rotating body;
    a resolution setting unit configured to change of a resolution of the rotation angle represented by a plurality of bits and detected by the angle detecting unit, by shifting a position of a predetermined number of bits to be referenced out of the plurality of bits representing the rotation angle, based on a value of a resolution precise switching signal,
    wherein the resolution setting unit changes the resolution precise switching signal between a logic-low value for high resolution and a logic-high value for low resolution,
    wherein when the resolution precise switching signal is a logic-high value, the position of the predetermined number of bits is shifted to the left, and by the left shift, the position of the least significant bit of the detected angle is shifted, reducing the resolution of the rotation angle; and
    an output unit that converts the rotation angle detected by the angle detecting unit into two-phase pulse signals, according to a value of the bits to be referenced at the position determined based on the value of the resolution precise switching signal, and outputs the two-phase pulse signals.

2. The rotation-angle detecting device according to claim 1, further comprising:
    a sinusoidal-wave-data storage unit that stores therein sinusoidal wave data corresponding to the rotation angle; and
    a sinusoidal-wave-data output unit that retrieves the sinusoidal wave data from the sinusoidal-wave-data storage unit on the basis of the rotation angle of the resolution set by the resolution setting unit, and outputs the retrieved sinusoidal wave data to the angle detecting unit, wherein
    the angle detecting unit detects the rotation angle on the basis of the sinusoidal wave signals and the sinusoidal wave data.

3. The rotation-angle detecting device according to claim 2, wherein the output unit converts the rotation angle detected by the angle detecting unit into the two-phase pulse signals with a shift of a quarter of a cycle, and outputs the two-phase pulse signals.

4. The rotation-angle detecting device according to claim 2, wherein the output unit converts the rotation angle detected by the angle detecting unit into the two-phase pulse signals each representing a positive direction or a negative direction, and outputs the two-phase pulse signals.

5. The rotation-angle detecting device according to claim 1, wherein a control signal for changing the resolution of the resolution setting unit is input from the outside.

6. An image processing apparatus that causes a rotation-angle detecting unit to detect a rotation angle of a rotating body and controls rotation of the rotating body, and performs image processing by driving a drive mechanism using the rotation of the rotating body, wherein the rotation-angle detecting unit is the rotation-angle detecting device according to claim 1.

7. The rotation-angle detecting device according to claim 1,
    wherein timing that the output unit outputs the two-phase pulse signal is based on the position of the bits to be referenced out of the plurality of bits representing the rotation angle and is based on the resolution set by the resolution setting unit.

8. A rotation-angle detecting device comprising:
    an angle detecting unit that detects a rotation angle of a rotating body based on sinusoidal wave signals output from multiple sensors arranged to have a phase difference, according to the rotation angle of the rotating body;
    a resolution setting unit configured to change of a resolution of the rotation angle represented by a plurality of bits and detected by the angle detecting unit, by shifting a position of a predetermined number of bits to be referenced out of the plurality of bits representing the rotation angle, based on a value of a resolution precise switching signal,
    wherein the resolution setting unit changes the resolution precise switching signal between a logic-low value for high resolution and a logic-high value for low resolution,
    wherein when the resolution precise switching signal is a logic-high value, the position of the predetermined number of bits is shifted to the left, and by the left shift, the position of the least significant bit of the detected angle is shifted, reducing the resolution of the rotation angle; and
    an output unit that converts the rotation angle detected by the angle detecting unit into an output signal, according to a value of the bits to be referenced at the position determined based on the value of the resolution precise switching signal, and outputs the output signal.

9. The rotation-angle detecting device according to claim 8, wherein the output unit converts the rotation angle detected by the angle detecting unit into two-phase pulse signals with a shift of a quarter of a cycle, and outputs the two-phase pulse signals.

10. The rotation-angle detecting device according to claim 8, wherein the output unit converts the rotation angle detected by the angle detecting unit into two-phase pulse signals each representing a positive direction or a negative direction, and outputs the two-phase pulse signals.

11. The rotation-angle detecting device according to claim 8, wherein the output unit converts the rotation angle detected by the angle detecting unit into a one-phase pulse signal and a direction indicating signal indicating a rotation direction of the rotating body, and outputs the one-phase pulse signal and the direction indicating signal.

12. The rotation-angle detecting device according to claim 8, wherein the output unit converts the rotation angle detected by the angle detecting unit into a serial signal, and outputs the serial signal.

13. A rotation-angle detecting method comprising:
    (a) detecting a rotation angle of a rotating body based on sinusoidal wave signals output from multiple sensors arranged to have a phase difference, according to the rotation angle of the rotating body;
    (b) allowing change of a resolution of the rotation angle represented by a plurality of bits and detected in (a), by shifting a position of a predetermined number of bits to be referenced out of the plurality of bits representing the rotation angle, based on a value of a resolution precise switching signal, wherein the resolution precise switching signal is changed between a logic-low value for high resolution and a logic-high value for low resolution, wherein when the resolution precise switching signal is a logic-high value, the position of the predetermined number of bits is shifted to the left, and by the left shift, the position of the least significant bit of the detected angle is shifted, reducing the resolution of the rotation angle; and (c) converting the rotation angle detected in (a) into two-phase pulse signals, according to a value of the bits to be referenced at the position determined based on the value of the resolution precise switching signal, and outputting the two-phase pulse signals.

14. The rotation-angle detecting method according to claim 13, further comprising:
(d) converting the rotation angle into an output signal, based on the resolution set in (b), and outputting the output signal.

15. The rotation-angle detecting method according to claim 14, further comprising:
converting the rotation angle detected in (a), into the two-phase pulse signals with a shift of a quarter of a cycle, and outputting the two-phase pulse signals.

16. The rotation-angle detecting method according to claim 13, wherein timing when the two-phase pulse signal is output in (c) depends on the position of the bits to be referenced out of the plurality of bits representing the rotation angle and depends on the resolution set in (b).

17. The rotation-angle detecting method according to claim 16, further comprising:
storing in a sinusoidal-wave-data storage unit sinusoidal wave data corresponding to the rotation angle; and
retrieving the sinusoidal wave data from the sinusoidal-wave-data storage unit, based on the rotation angle of the resolution set in (b), and outputting the retrieved sinusoidal wave data, wherein
the rotation angle is detected in (a) on the basis of the sinusoidal wave signals and the sinusoidal wave data.

18. The rotation-angle detecting method according to claim 13, further comprising:
storing in a sinusoidal-wave-data storage unit sinusoidal wave data corresponding to the rotation angle; and
retrieving the sinusoidal wave data from the sinusoidal-wave-data storage unit, based on the rotation angle of the resolution set in (b), and outputting the retrieved sinusoidal wave data, wherein
the rotation angle is detected in (a) on the basis of the sinusoidal wave signals and the sinusoidal wave data.

* * * * *